(12) United States Patent
Dardashti

(10) Patent No.: US 10,486,724 B2
(45) Date of Patent: Nov. 26, 2019

(54) CONFIGURABLE CART SYSTEM

(71) Applicant: Shahriar L. Dardashti, Santa Fe Springs, CA (US)

(72) Inventor: Shahriar L. Dardashti, Santa Fe Springs, CA (US)

(73) Assignee: ATLANTIC REPRESENTATIONS, INC., Santa Fe Springs, CA (US)

( * ) Notice: Subject to any disclaimer, the term of this patent is extended or adjusted under 35 U.S.C. 154(b) by 21 days.

(21) Appl. No.: 15/674,958

(22) Filed: Aug. 11, 2017

(65) Prior Publication Data

US 2019/0047602 A1  Feb. 14, 2019

(51) Int. Cl.
*B62B 3/02* (2006.01)
*B62B 3/14* (2006.01)
*B62B 3/16* (2006.01)

(52) U.S. Cl.
CPC ............ *B62B 3/022* (2013.01); *B62B 3/1444* (2013.01); *B62B 3/16* (2013.01); *B62B 2206/02* (2013.01)

(58) Field of Classification Search
CPC ... B62B 3/022; B62B 3/1444; B62B 2206/02; B62B 3/006; B62B 3/005; B62B 3/16; B62B 3/02; A47D 5/00
USPC .......................................... 280/47.35; 4/619
See application file for complete search history.

(56) References Cited

U.S. PATENT DOCUMENTS

| | | | | |
|---|---|---|---|---|
| 5,090,725 A * | 2/1992 | Feldner | ..................... | B62B 3/02 211/189 |
| 5,186,479 A * | 2/1993 | Flowers | ..................... | B62B 3/02 206/511 |
| 6,669,214 B1 * | 12/2003 | Domis | ..................... | B25H 3/00 280/47.19 |
| 2010/0164192 A1 * | 7/2010 | Wenner | ..................... | A47D 5/00 280/47.35 |
| 2016/0159382 A1 * | 6/2016 | Eisenhut | ................. | A47L 13/50 280/47.35 |

* cited by examiner

*Primary Examiner* — Paul N Dickson
*Assistant Examiner* — Hilary L Johns
(74) *Attorney, Agent, or Firm* — Tracy M. Heims; Apex Juris, pllc.

(57) ABSTRACT

A configurable cart system having an accessory receiving base frame with a bottom, an external perimeter, an internal perimeter and a top where there is a mounting portion between the external perimeter and the internal perimeter, and the frame is designed to be used with at least one accessory dimensioned to fit into the frame, and where the accessory has an accessory bottom, a resting portion that matingly rests on the mounting portion of the accessory receiving base frame and at least two protrusions projecting from at least two different points on the accessory bottom where the protrusions are positioned on the accessory bottom so that the protrusions abut the internal perimeter of the receiving frame to prevent the accessory from horizontal movement.

20 Claims, 35 Drawing Sheets

CONFIGURABLE CART SYSTEM

FIELD OF THE INVENTION

This invention relates to the field of utility carts and specifically, configurable, portable utility cart systems. It relates to cart systems that are easily configurable so that a user can have a variety of orientations and configurations and more specifically to cart systems that have a multitude of accessories, such as shelving systems, cutting board systems, glass hanging systems, bottle racks, basket systems, drawer systems, shoe racks, hangers, coolers, desk systems, just to mention a few.

BACKGROUND OF THE INVENTION

This invention is for a configurable cart system having a first accessory receiving base apparatus that has a perimeter rim for receiving and securely mounting a variety of cart accessories. This system ideally has at least one second accessory receiving frame positioned above the first accessory receiving base frame having a like configured perimeter rim for receiving a variety of accessories where the accessory receiving frame receiving rim has a mounting portion configured to receive and securely affix a variety of accessories so that a user can easily modify said cart system and where the system will enable the cart to provide a variety of orientations, configurations and permutations to a user for various applications and uses.

One of the problems associated with existing cart systems is that they are fixed and set in one orientation or configuration. The conventional cart systems provide for a cart with a fixed shelf, or a fixed basket, or a fixed glass hanger, fixed drawers, fixed shoe hanger or whatever configuration is desired by the manufacturer. The existing cart systems do not allow a user to rearrange different components or accessories, reorient the accessories or change out different platforms. In other words, the known systems have a variety of shelves, or cutting blocks, or hangers, but all of these are components that are fixed in a set position and the user is unable to change out the accessories to make different configurations and thus there is no way to adjust or change the original orientation of the platforms of the cart. The user is stuck with the original cart configuration and is unable to adjust, modify, or change the original cart system orientation. The user was also unable to add or change the cart configuration. There are no accessories for different uses and different purposes. Because of this limited adjustability the user is forced to purchase or obtain different carts for different uses instead of being able to purchase one cart frame and then have a variety of accessories to add to and to modify the cart. Having to purchase multiple cart systems is costly, is inconvenient and is environmentally unfriendly.

SUMMARY OF THE INVENTION

The present invention solves these and other problems by providing a cart system that is configurable, adjustable and changeable depending upon the user's needs and desires. Thus, the disclosed systems of the present invention are much more adaptable, configurable, changeable, utilitarian, functional, practical and even expandable.

The present invention provides a cart system that includes a variety of accessory accepting units combined with a variety of accessories. The system typically has a first base accessory accepting unit that may have casters or wheels affixed to a bottom of the lower base accessory accepting unit. This lower unit has an accessory accepting platform around the perimeter of the lower unit that can receive and securely affix a variety of accessories, including shelves, cutting blocks, clear shelves, baskets, glass or cup hangers, drawer systems, shoe racks, hangers, coolers, desk systems or any of a variety of accessories for any of a variety of uses. The cart system can also have additional accessory accepting platforms that can be mounted above the first base unit that can also receive a variety of accessories, including shelves, cutting blocks, baskets, glass or cup hangers, drawer systems, shoe racks, hangers, coolers, and desk system or any of a variety of accessories. These additional accessory accepting platforms or frames allow the cart to be expanded and enlarged.

The present invention is a configurable cart system having an accessory receiving base frame with a bottom, an external perimeter, an internal perimeter and a top where there is a mounting portion between the external perimeter and the internal perimeter, and the frame is designed to be used with at least one accessory dimensioned to fit into the frame, wherein the accessory has an accessory bottom, a resting portion that matingly rests on the mounting portion of the accessory receiving base frame and at least two protrusions projecting from at least two different points on the accessory bottom where the protrusions are positioned on the accessory bottom so that the protrusions abut the internal perimeter of the receiving frame to prevent the accessory from horizontal movement. A more detailed explanation is provided in the following specification.

BRIEF DESCRIPTION OF THE DRAWINGS

FIG. 5B is a bottom view of the shelf accessory shown in FIG. 5a;

FIG. 5C is a side view of the shelf accessory shown in FIG. 5a;

DETAILED DESCRIPTION OF THE EMBODIMENTS

Presently, conventional cart systems are typically simple and singularly utilitarian. A user can purchase a cart for one use and it generally can only be used for that one specific use. For example, if a user desires a utility cart with a flat surface designed for cutting or for simply supporting items on a flat surface, then the cart will have a flat top surface. If the user desires a cart with baskets, then that is what is available—a cart with baskets. If the user wants a cart designed to carry and hold tools, then again, that is all that the cart can provide. Likewise, for a cart with baskets, bottle holders, or any other variety of designs. Thus, there is a need to have a single cart that can be changed, modified and configured to whatever the user desires. The present invention provides for a configurable cart that has a variety of accessories and that is virtually limitless in its applications.

Figure 5A:
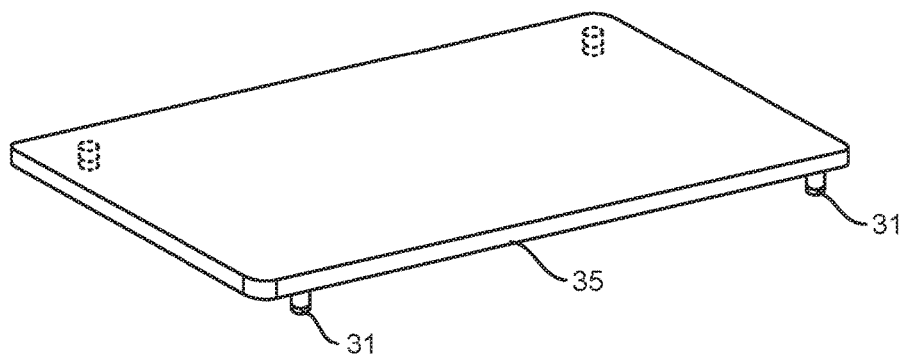
FIG. 5A is a perspective view of a shelf accessory of the cart system shown in FIG. 1.
Figure 5B:
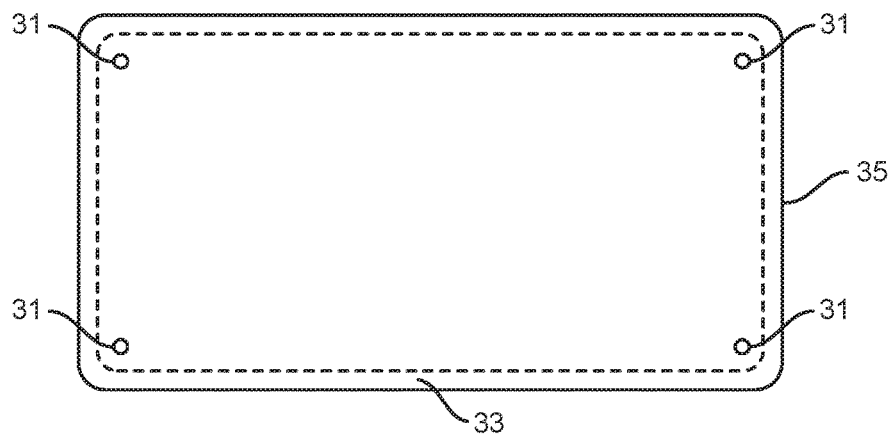
Figure 5C:
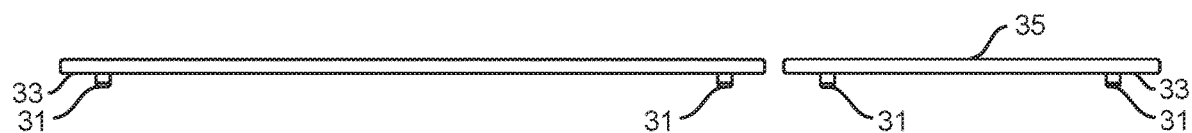
Figure 6:
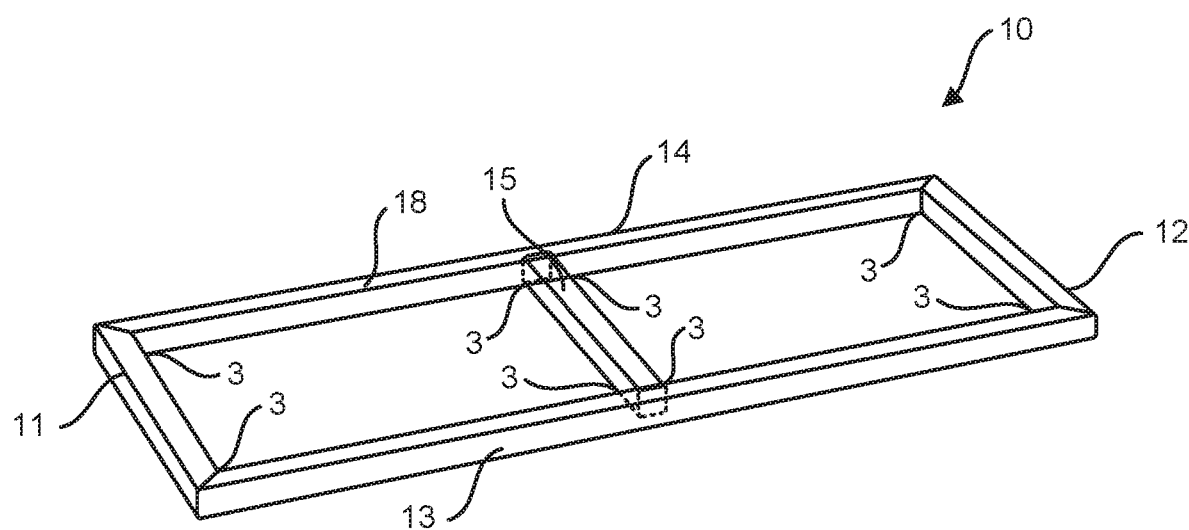
FIG. 6 is a perspective view of an accessory receiving frame.

FIGS. 1-7 show a first embodiment of the inventive subject matter. The system is a configurable cart system 1 having a first accessory receiving base frame 10 for receiving and mounting a variety of cart accessories. This first accessory receiving base frame 10 has a top 8, a bottom 9 and can have a foot, or feet that solidly sit on the ground or the feet may be casters 17 that are attached to the bottom 9 of the frame so that the unit can be easily moved from place to place. FIGS. 6, 7A and 7B clearly show the different elements of the base accessory receiving frame. The base accessory receiving frame 10 has at least one side configured to receive and securely affix a variety of accessories. This side has a mounting portion 18 that is located between an internal perimeter 2 and an external perimeter 6. An internal perimeter edge meets at four points to form corners 3. The mounting portion 18 has an internal mounting portion 4 and an external mounting portion 5. The system also has at least one accessory for use with, or insertion into the accessory base receiving frame 10, where the accessory has at least two protrusions 31 from at least two different points on an edge of the accessory, so that the protrusions 31 fit against at least one side of the receiving frame and more particularly, against internal perimeter 2 and still more particularly, the protrusions fit snuggly in the corners 3. In a preferred embodiment the accessory receiving frame 10 has external perimeter 6 dimensions of approximately 12 inches by 18 inches and internal perimeter dimensions being 9 inches by 15 inches so that the base accessory frame is approximately 3 inches wide, thus forming the mounting portion 18. This allows for the accessory to easily rest on approximately 1.5 inches of mounting surface of the base accessory frame, such as the internal mounting portion 4, and leaving an external perimeter of approximately 1.5 inches exposed, thus forming the external mounting portion 5. The dotted line in FIG. 7A shows the internal mounting portion 4 and the external mounting portion 5 that form the entire mounting portion 18.

Although relatively simplistic, this system allows a large variety and number of accessories to be inserted into and used with the cart frame. Ideally this first configuration will be square or rectangular in shape, but it could be any orientation, size, figure or shape, including but not limited to square, rectangular, oval, circular, oblong, pear, teardrop, or any other shape. The cart of the first embodiment, as mentioned above, could feature caster wheels 17 or some other type of wheel attached to the bottom 9 in order to more easily move the cart 1 around. However, it is not required to have casters or wheels and thus instead could simply have legs so that the unit could stand in one place.

To illustrate the inventive subject matter, a first embodiment is detailed in FIGS. 1 through 7. The cart 1 has an accessory base frame 10 that has receiving holes or caster holes 16 of some sort in order to receive or hold casters 17 to the bottom 9 of the base. Above the casters is the perimeter of the base where the sides ideally form a shape such as a square or a rectangle, and the sides are connected at corners or are somehow connected to form a shape. The perimeter of the base is unique in that it is designed to receive and securely maintain and hold a variety of accessories. In the first embodiment, the perimeter is formed by connecting the sides. So, connecting first end 11 to first side 13, first side 13 to second end 12, and second end 12 to second side 14, thus forming a square or rectangle. This perimeter then has casters 17 inserted therein at the bottom 9, as described above. Ideally, the accessory base frame 10 has the external perimeter 6 and the internal perimeter 2 where the internal perimeter 2 is designed to secure the accessories at the corners 3. Additionally, the accessory base frame 10 has the mounting portion 18 that has the internal mounting portion 4 and the external mounting portion 5. In most cases the accessory has a portion that rests on the internal mounting portion 4. However, some accessories are designed to actually rest on the external mounting portion 5, such as the glass hanger to be later shown and described. A wide variety of accessories can be added to the base frame 10 as are described below. In addition, the accessory base frame 10 can have a cross connector 15 so that the frame can receive and securely hold and maintain more than one accessory. This cross connector also has the elements of the mounting portion 18 in that when in place it forms an additional mounting portion for the accessories. All the accessories utilize the unique accessory base frame 10 to secure and connect the accessories to the cart system 1. The accessories will now be described in more detail.

Basket.

Figure 1:
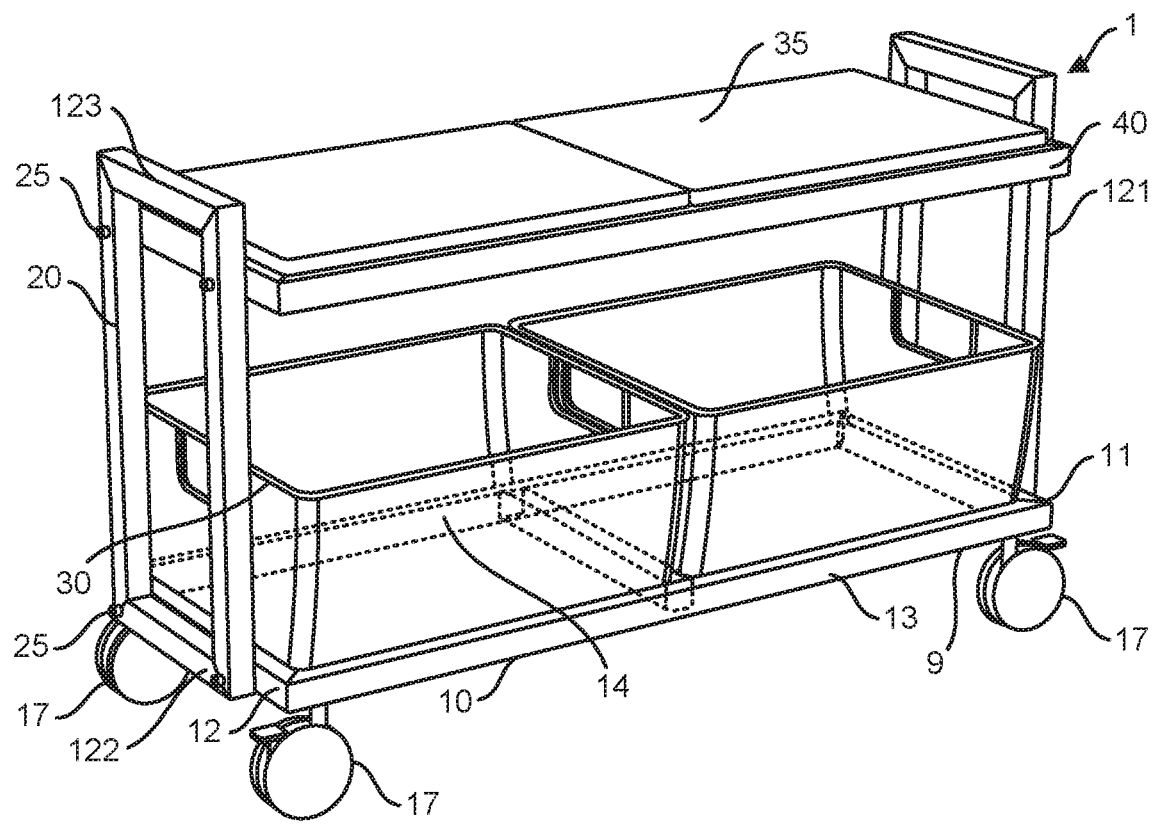
FIG. 1 is a perspective view of a cart system according to a first embodiment of the inventive subject matter, having two basket accessories and two shelves.
Figure 2:
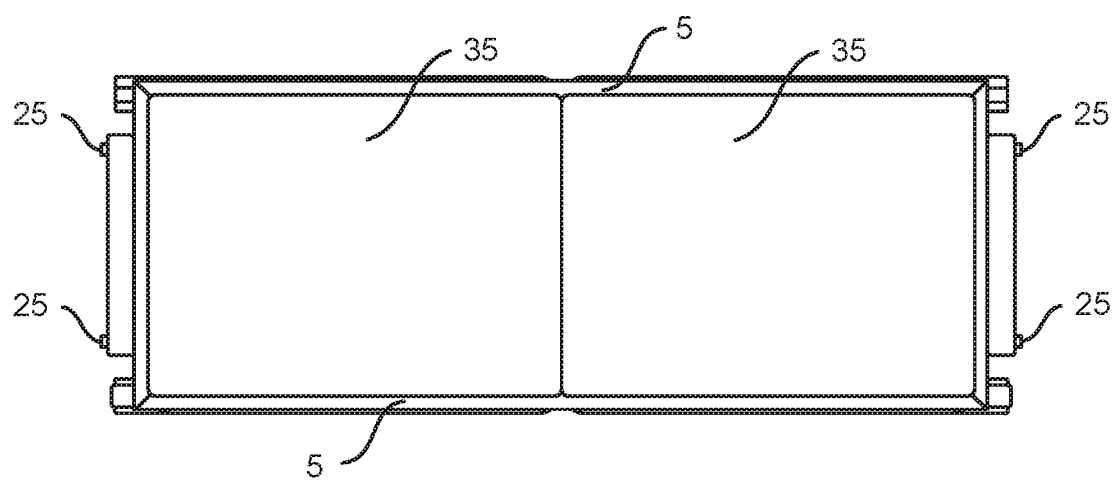
FIG. 2 is a top view of the cart system according to the first embodiment with the shelf accessories in place.

A first accessory defined here is a basket unit 30, as can be seen in FIGS. 1, 3, 4, FIGS. 8-19 and FIGS. 26-27. The figures show how the basket can be flattened for packing and shipping, they show how the basket can be assembled and they show how it can be used as a stackable basket or a stand-alone basket. FIG. 1 shows a first configuration that is two accessories wide and where the accessory base frame 10 has two baskets 30 inserted therein. These baskets 30 have bottoms with protrusions 31 that are designed to be securely wedged against and into the internal perimeter 2 of the base unit. The basket unit 30 has a bottom, outside perimeter that is approximately 11 inches wide by 15 inches long and where there is a resting portion 32 and the mounting or securing member, or a protrusion 31 that matingly fits into the corners 3 of the internal perimeter 2 of the accessory base frame 10. The resting portion 32 ideally rests on the internal mounting portion 4 of the base frame 10. There can be two or more protrusions 31 protruding from the bottom of the basket 30 but ideally more than one so that the basket 30 is restricted and cannot move from side to side. These protrusions 31 are located slightly inside an external perimeter of the basket 30 and are designed so that they fit snuggly into the corners 3 of the internal perimeter 2 of the accessory base frame 10. The protrusions are located inside the perimeter of the accessory so that the surface area around the perimeter of the basket bottom surface, such as resting portion 32, can rest upon the internal mounting portion 4, that forms a support portion around the accessory receiving base frame 10, as described above. Ideally, there is also a small portion between the outside perimeter of the basket and the outside perimeter of the accessory frame, forming the external mounting portion 5 where both the internal mounting portion 4 and the external mounting portion 5 together form the mounting portion 18. Both the internal mounting portion 4 and the external mounting portion 5 can be anywhere from ¼ inch to an 1 inch or more. This additional portion on the external mounting portion 5 can be used for alternative accessories, such as glass hangers, as will be described below, or any other accessory that can hang from this portion. As set out above, the protrusions 31 secure the basket unit 30 to the accessory base frame 10 by snuggly fitting into each corner 3 of the internal perimeter 2, and thus prevent movement of the basket unit relative to the accessory receiving base frame in a horizontal lane. The protrusions 31 are designed to more firmly and securely hold and connect the basket 30 to the base unit internal perimeter 2 and the mating portion could be a series of protrusions, pegs, or feet that matingly fit within the base perimeter corners 3 and against the internal perimeter 2. Although the corners 3 are where the protrusions are ideally placed they could be anywhere along the internal perimeter 2 so long as they limit the basket's motion. Alternatively, these mating members could be a groove, a hole, a snap or any other type of securing apparatus or configuration that prevents the basket from movement in the horizontal direction. It should also be noted that it is possible to place one basket in the frame or alternatively two or more baskets side by side in the same base frame 10 with the simple addition of the cross connector 15. This cross connector 15 provides the additional support needed to hold and secure the additional basket along with providing the additional top mounting portions required to keep the accessory stable and secure. It is basically a cross bar running from one side of the base frame to the other, as is shown in FIGS. 6 and 7. Also, when in place, the cross bar provides a supplemental mounting portion where resting portion 32 may be seated and rest.

Figure 15:
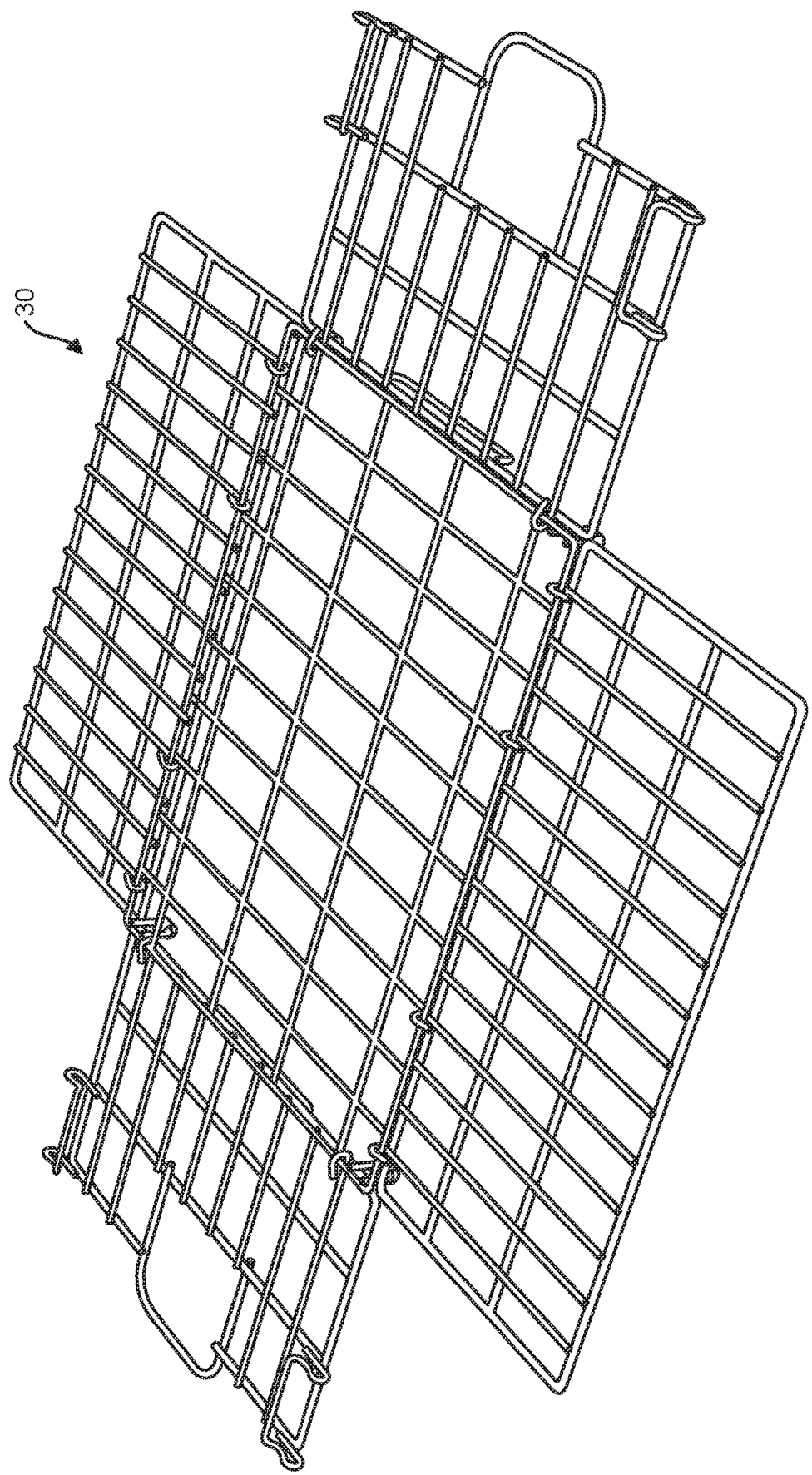
FIG. 15 is a perspective view of the basket accessory of the present invention when flattened.
Figure 16:
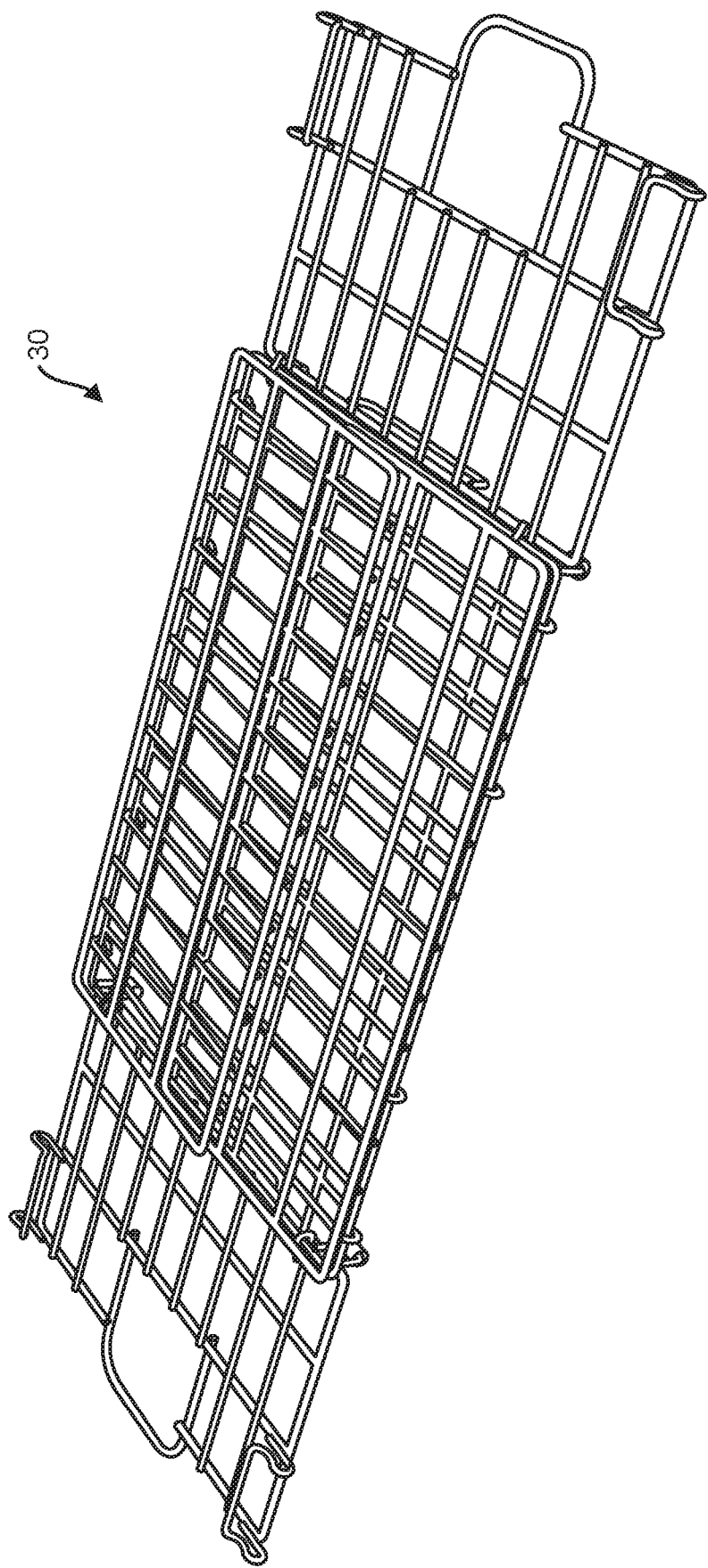
FIG. 16 is a perspective view of the basket accessory of the present invention when ready to package.
Figure 17:
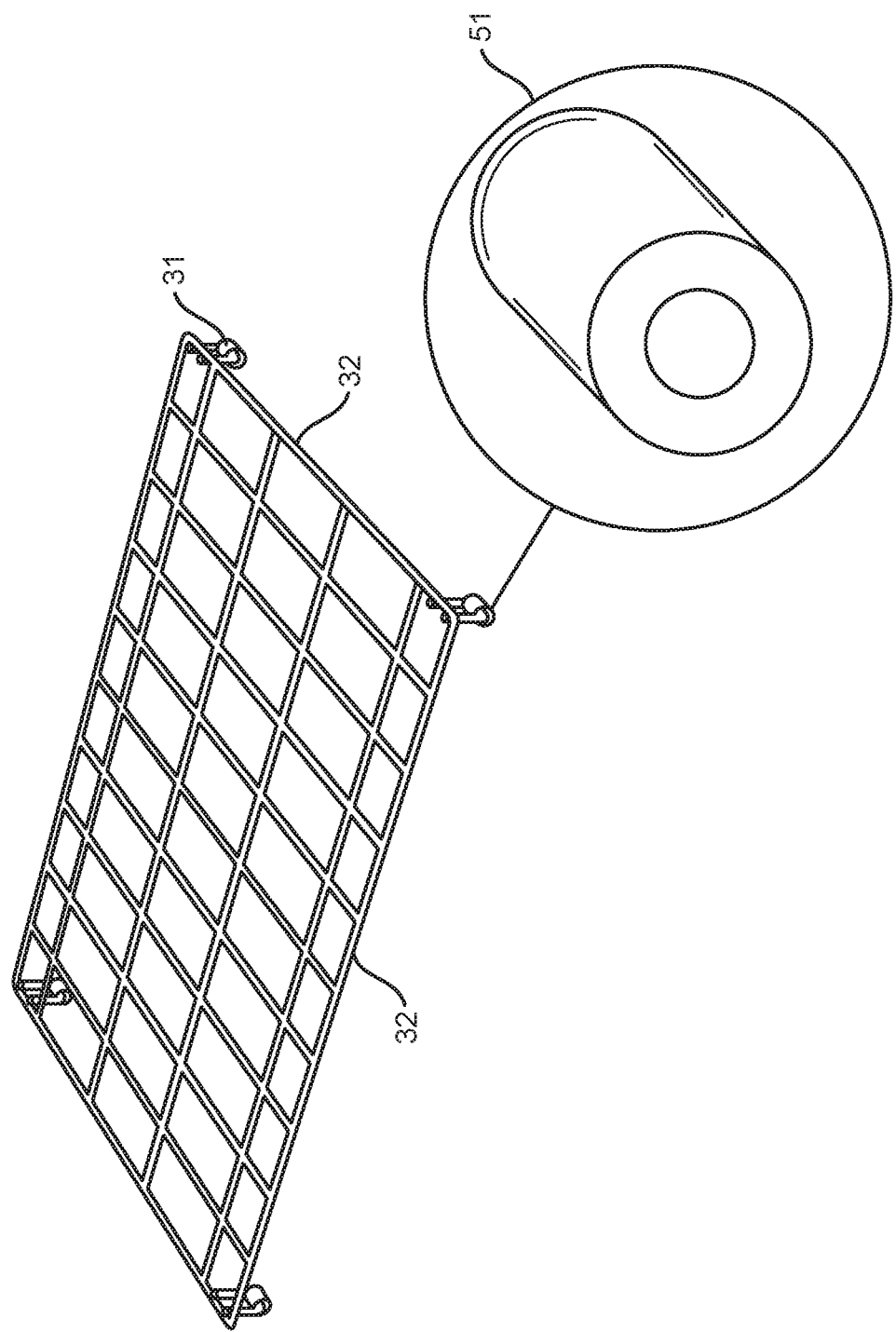
FIG. 17 is a perspective view and end view of the basket accessory bottom portion and a close-up of the rubber pipe portion of the basket of the present invention.
Figure 18:
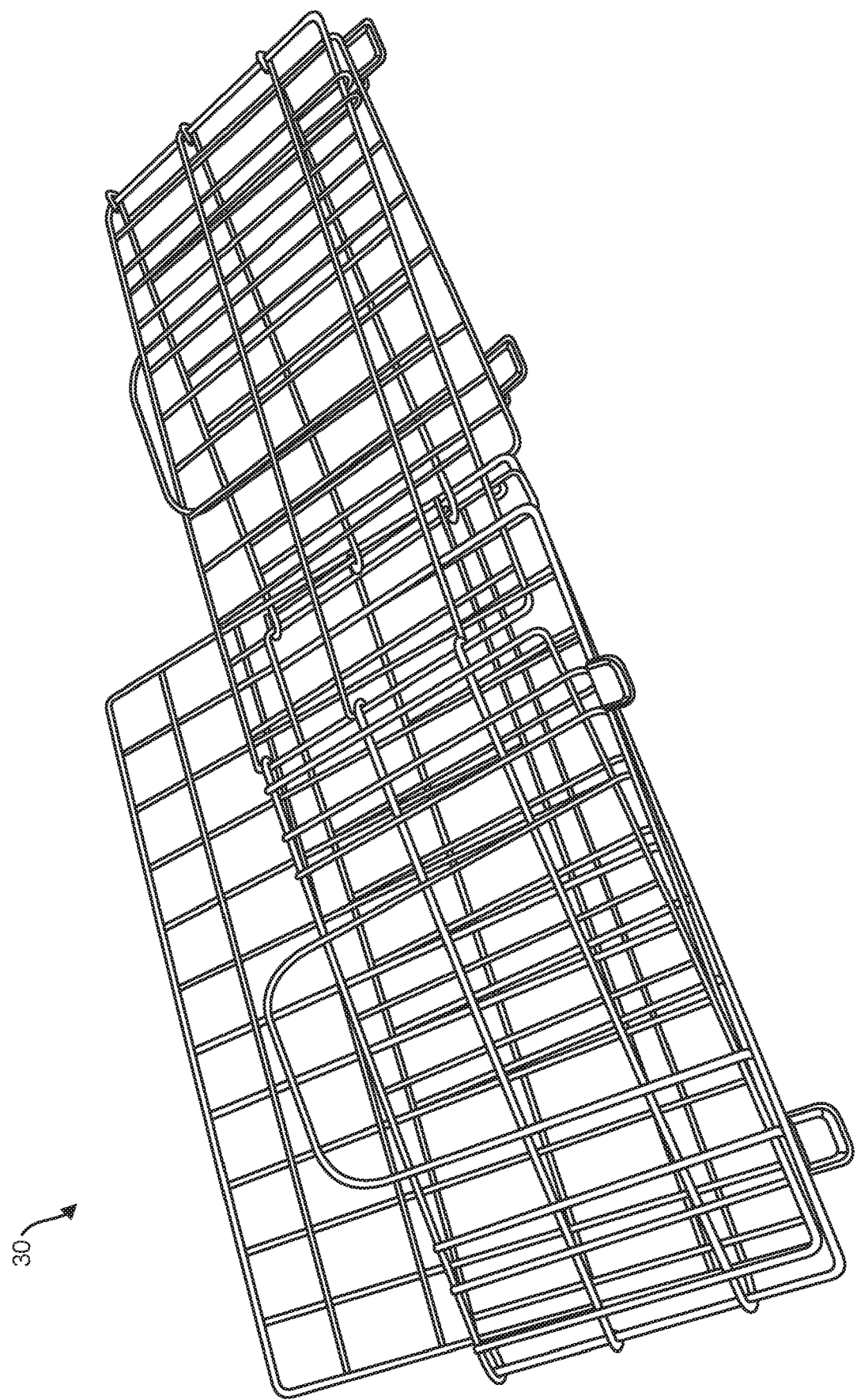
FIG. 18 is another view of the basket when flattened.
Figure 19:
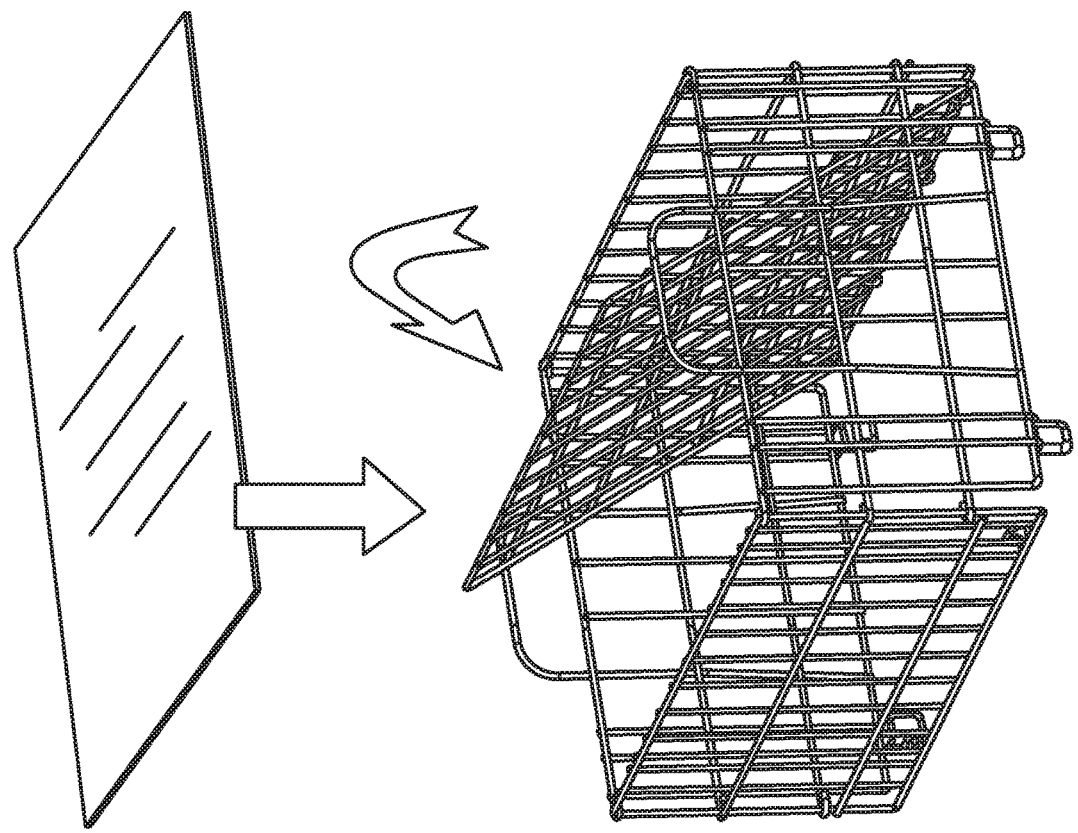
FIG. 19 is a perspective view of the basket showing how it goes together and is assembled.
Figure 24:
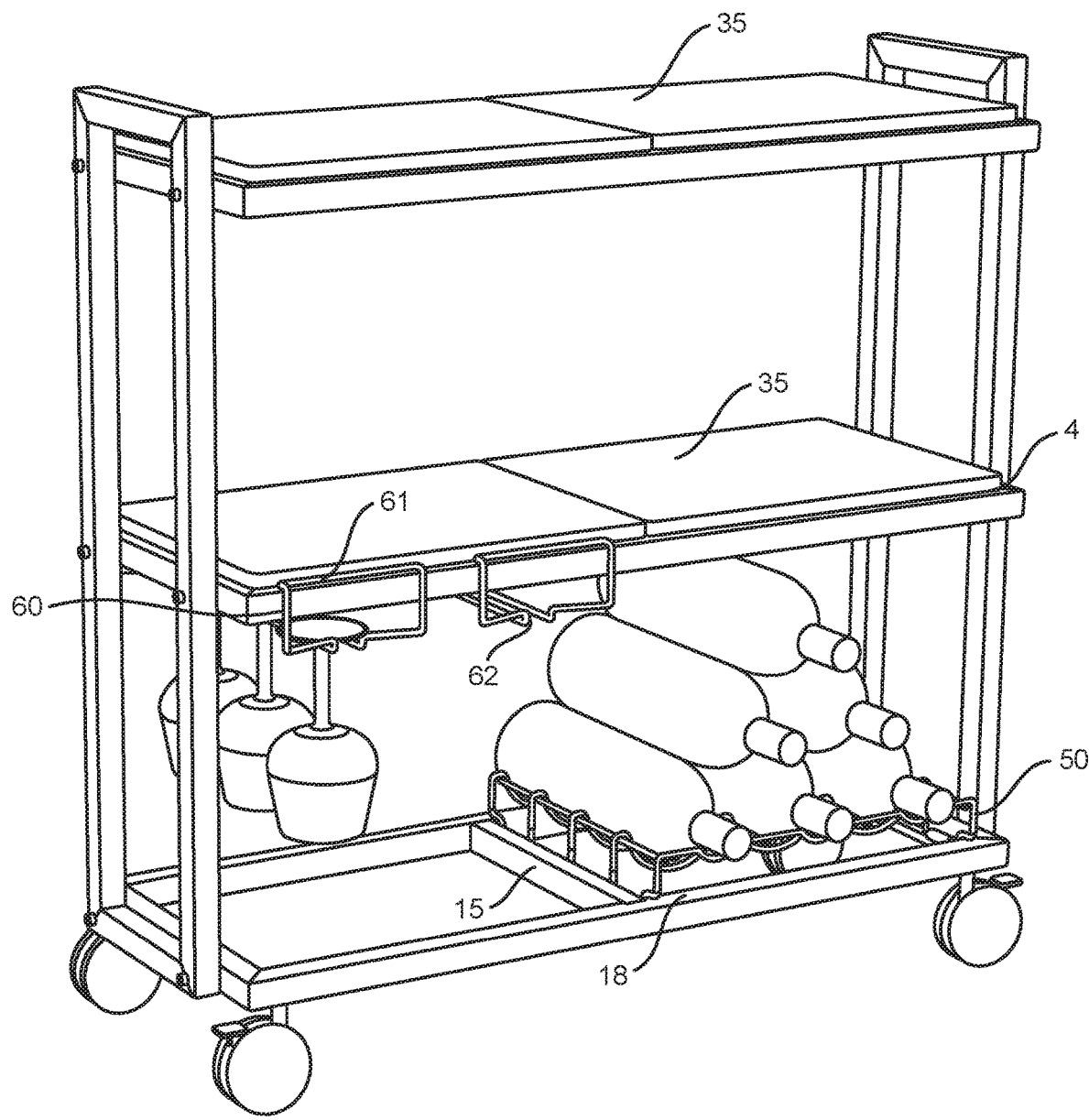
FIG. 24 is a perspective view of the cart system of the present invention having the bottle rack installed on the first accessory base frame, shelves and glass hangers installed on the second accessory frame and shelves on the third accessory frame.

Another feature of the baskets is that they are collapsible, as can be seen in FIGS. 15 and 16. This allows for easy storage of the baskets along with easier shipping when boxed. The baskets break down into flat units that take up less space. In addition, the baskets are stackable, as seen in FIG. 24. Because of this, and the rubber feet, as shown in FIG. 17, the baskets can either be stacked within the cart system or they can be removed and used as stand-alone stackable baskets. The rubber feet both hold them in place while in the system and provide a soft base when the baskets are out of the cart system.

Shelf.

Figure 3:
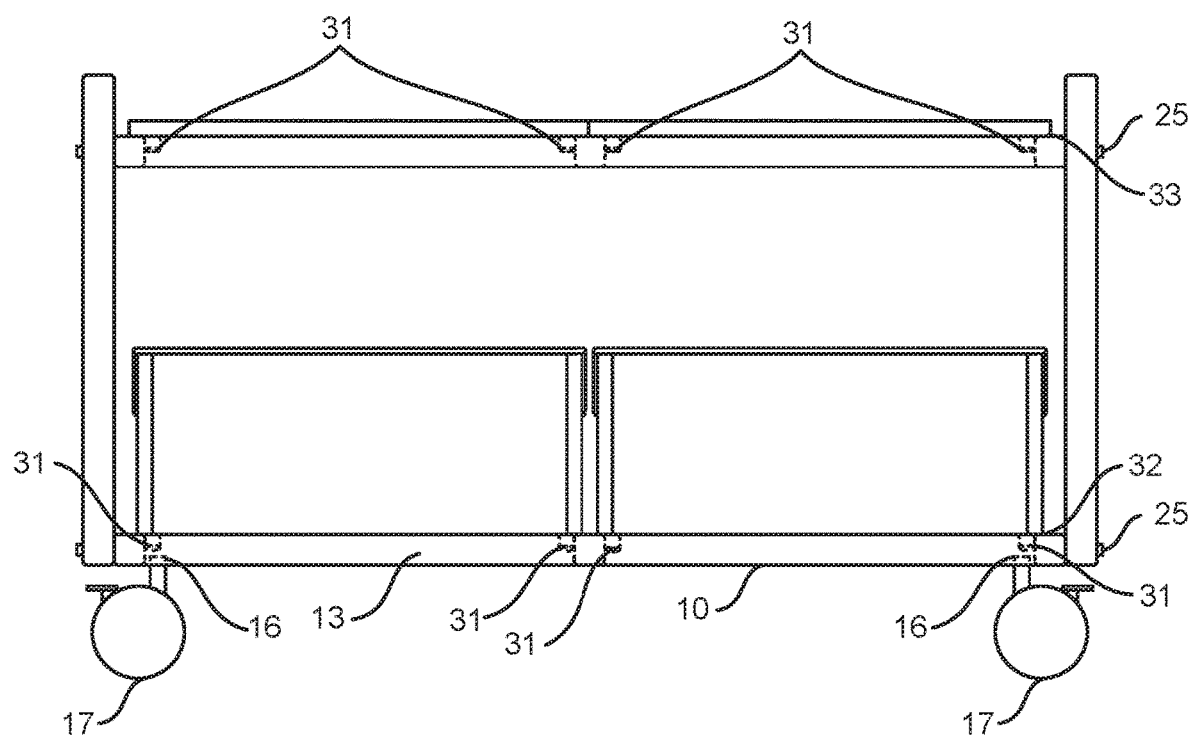
FIG. 3 is a front view of the cart system shown in FIG. 1.
Figure 4:
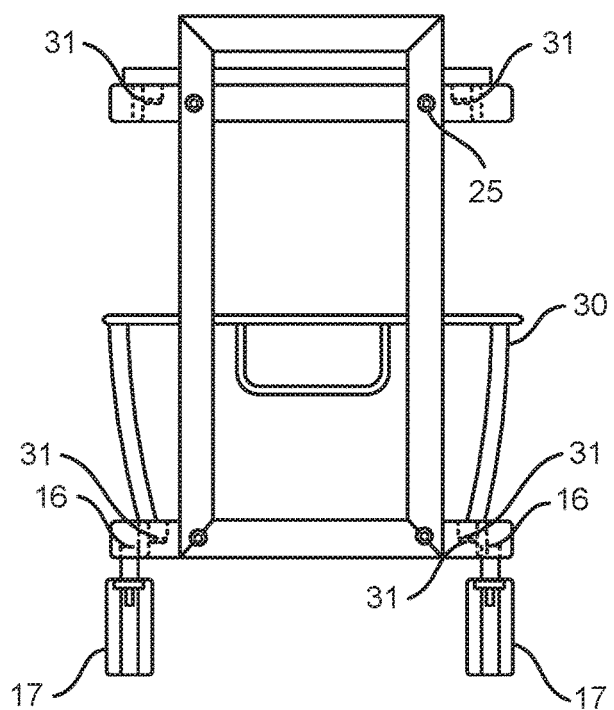
FIG. 4 is a side view of the cart system shown in FIG. 1.

This system of securing the baskets is also employed to a variety of other accessories. Because of the unique and relatively simplistic design it can easily be used on the perimeter or base of a cutting board, a shelf, a shelf with drawers, a shallow recessed shelf, an elevated shelf, or virtually any other imaginable accessory. FIGS. 2, 3, 4 and 5a, 5b, and 5c show a detailed close-up and in use applications of a shelf 35. FIGS. 5a, 5b and 5c show the shelf 35 or tray having a resting portion 33 and the protrusions 31 on the bottom of the shelf unit designed for use with, or insertion into the accessory base frame 10 using the internal perimeter 2 and corners 3 of the accessory base frame 10. In this configuration, the protrusions 31 or securing members are inserted into the corners 3 where the ends and sides of the internal perimeter of the accessory base frame 10 meet. The resting portion 33 of the shelf 35 can easily rest on the internal mounting portion 4 of the accessory base frame 10 to support the perimeter of the shelf and to provide a stable mount while the protrusions are secured in the corners 3 of the accessory base frame 10, thus holding the shelf in place and preventing movement. The protrusions 31 are also clearly seen in FIG. 3. Also shown in FIG. 3 is the shelf unit with the resting portion 33 resting on the accessory base frame 10. the protrusions in the corners 3, and the internal mounting portion 4. Corners 3 and internal mounting portion 4 are more clearly show in FIG. 7A.

Obviously the shelf of this system is not limited to a flat shelf. It could be a butcher block, a cutting block, glass plate, metal plate, plexi-glass plate, a shelf with built in recesses for holding items such as silver ware, tools, beads, jewelry, or any other variety or configuration. Any shelf configuration will work as long as it fits to the perimeter of the accessory base frame 10, has the resting portion 33 to provide a base to solidly hold the shelf, and has protrusions 31 on the bottom side to fit into the corners 3 to limit motion and movement.

Figure 7A:
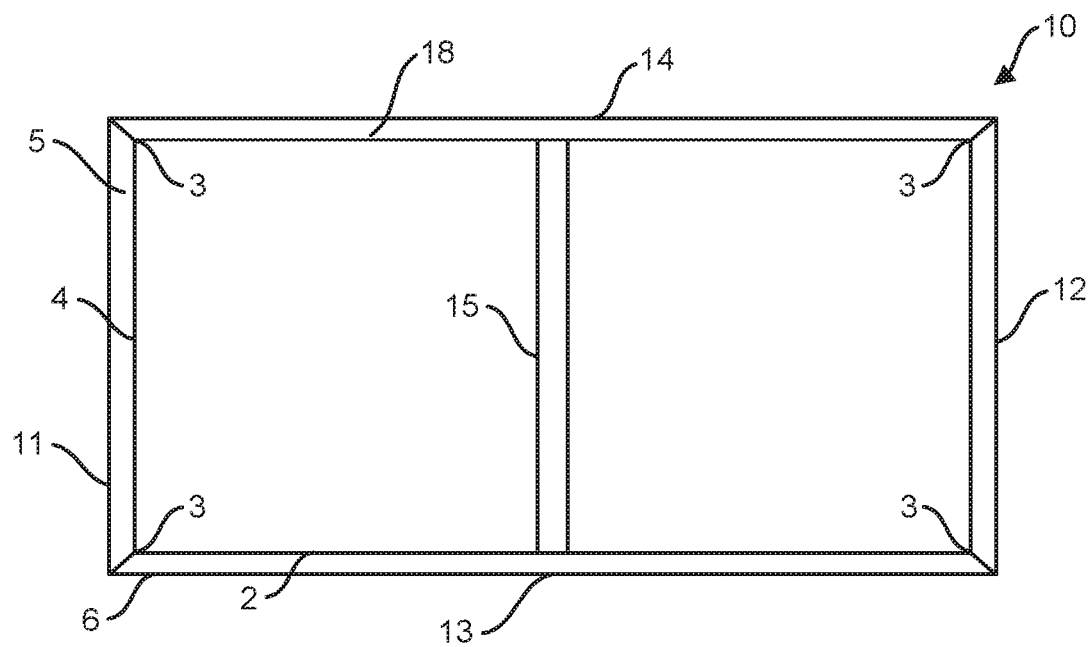
FIG. 7A is a top view of the accessory receiving frame.
Figure 7B:
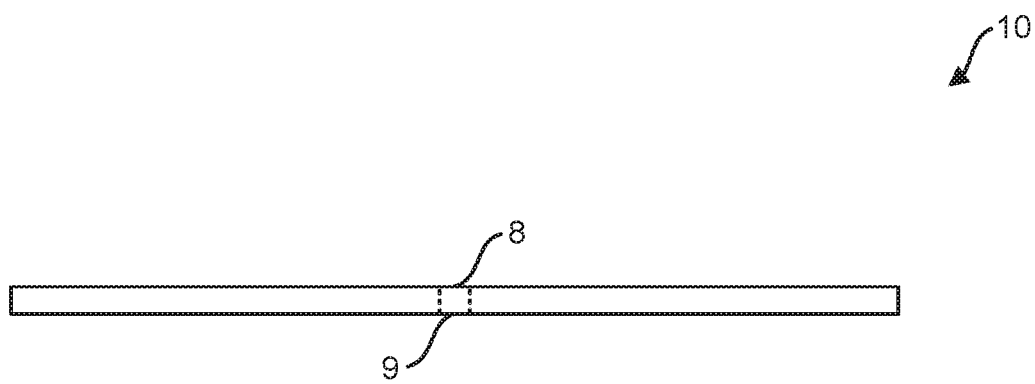
FIG. 7B is a side view of the accessory receiving frame.

It should also be noted again that it is possible to place two or more shelves side by side in the same base frame 10 with the simple addition of the cross connector 15. This cross connector 15 provides the additional support needed to hold and secure the additional shelves. It is basically a cross bar running from one side of the base frame to the other, as is shown in FIGS. 6 and 7A. When in place the cross connector 15 also provides a mounting portion for the resting portion 33.

Additional Tiers.

Figure 34A:
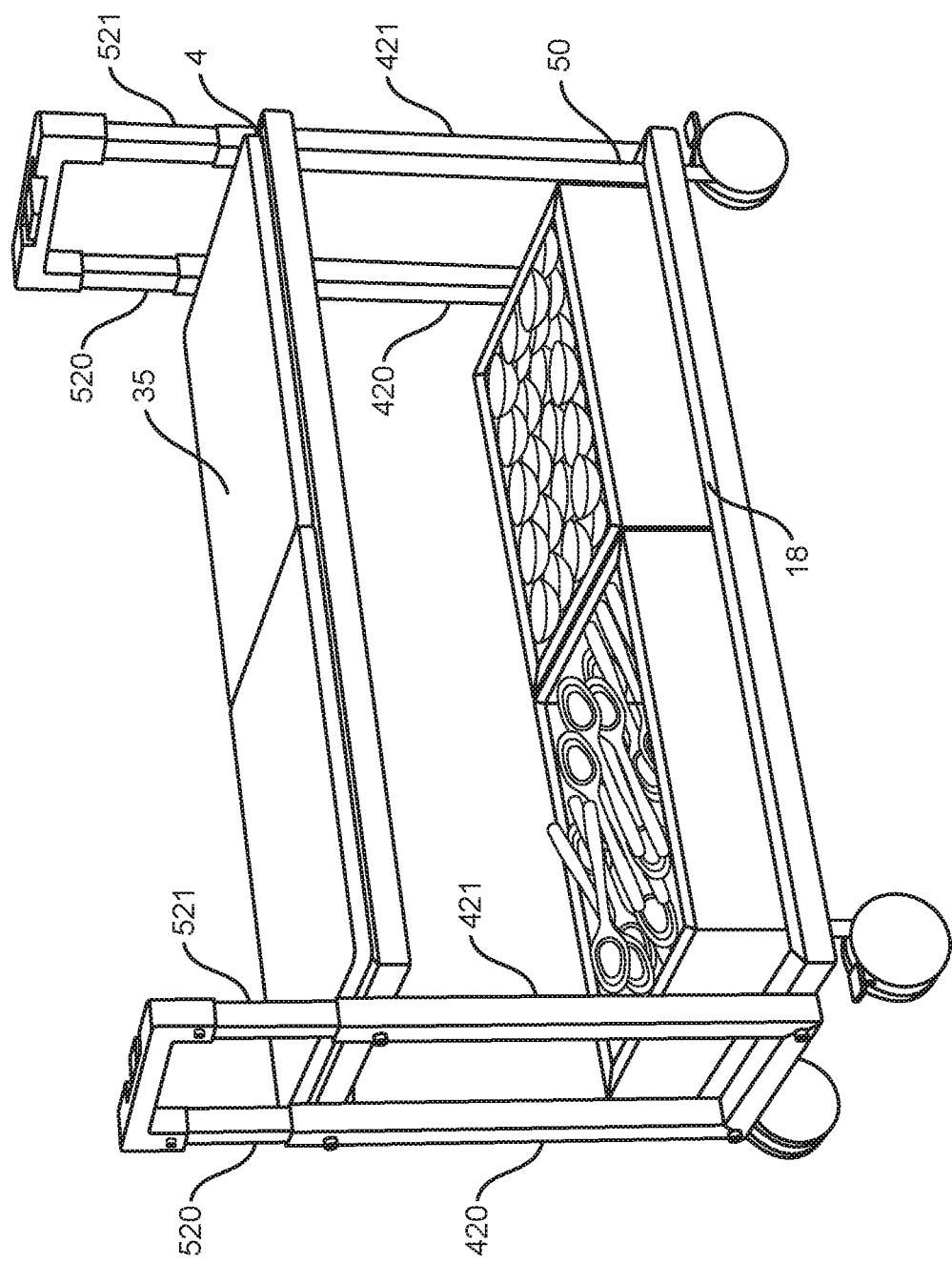
FIG. 34A is a perspective view of the cart system with two tiers having extendable end frames.
Figure 34B:
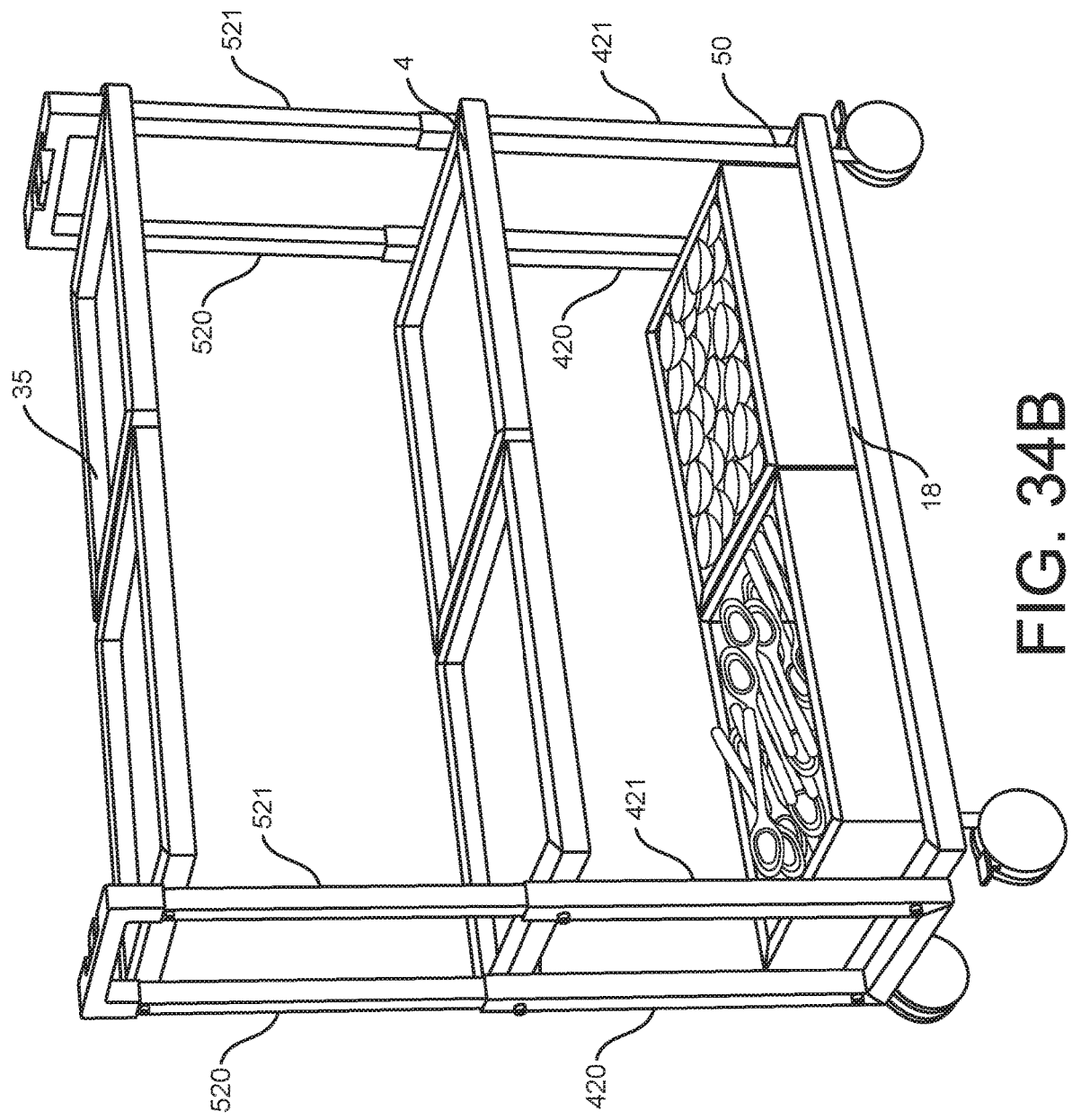
FIG. 34B is a perspective view of the cart system with three tiers have extendable end frames.

Another feature of the inventive subject matter is that it is easily expandable to have additional tiers. In a second embodiment, the cart system 1 is larger and has a second accessory accepting frame level or tier that utilizes the same design as the accessory base frame 10. As shown in FIGS. 1, 3 and 4, in this embodiment there is a first shelving end frame 20 and a second shelving end frame 21. These shelving end frames are attached to the accessory base frame 10 at each end, as seen in FIG. 1. There are holes through which connectors 25 fit. These end frame holes match up with base frame holes where the base frame holes can be through holes where the connector is a bolt and where a nut can be fastened to the bolt after the bolt is inserted through both end frame holes and base frame holes thus securing the end frames 20, 21 to the base frame 10 at each end. Alternatively, the fastener could be a threaded screw that is inserted into a threaded portion on the base frame 10 whereby the screw is tightened into the threaded portion to secure the parts one to another. Also, the end frames could be adjustable, expandable and extendable as shown in FIGS. 34A and 34B. The end units in this configuration have external tubing 420, 421 and an internal tubing 520, 521 where the external tubing 420, 421 is wider than the internal tubing 520, 521 so that the internal tubing 520, 521 can telescope in and out of the external tubing 420, 421 causing the end unit to become taller and thus to allow for the addition of extra accessory frames. These end frames could employ simple telescoping, such as push pins, or it could use bolts, screws, or any other type of securement apparatus that would allow for the end frames to be extended to allow for additional accessory frames.

After securing the end frames 20, 21 to the base frame 10 it is possible to add a second accessory frame 40 that is positioned above the first accessory base frame 10. This second accessory frame 40 is secured to the cart 1 in the same way that the accessory base frame 10 is connected. That is, there are end frame holes through which connectors 25 fit, or through the telescoping end frames or any other type of securing or fastening means. These end frame holes match up with second accessory frame holes and where the second accessory frame holes can be through holes where the connector 25 is a bolt and where a nut can be fastened to the bolt after the bolt is inserted through both end frame holes and second accessory frame holes thus securing the end frames 20, 21 to the second accessory frame 40 at each end. Alternatively, the fastener could be a threaded screw that is inserted into a threaded portion on the second accessory frame 40 whereby the screw is tightened into the threaded portion to secure the parts one to another. Alternatively, the end frames could employ an extendable mechanism, as defined above, so that the end frames could easily be heightened or lowered depending upon the user's needs.

Figure 8:
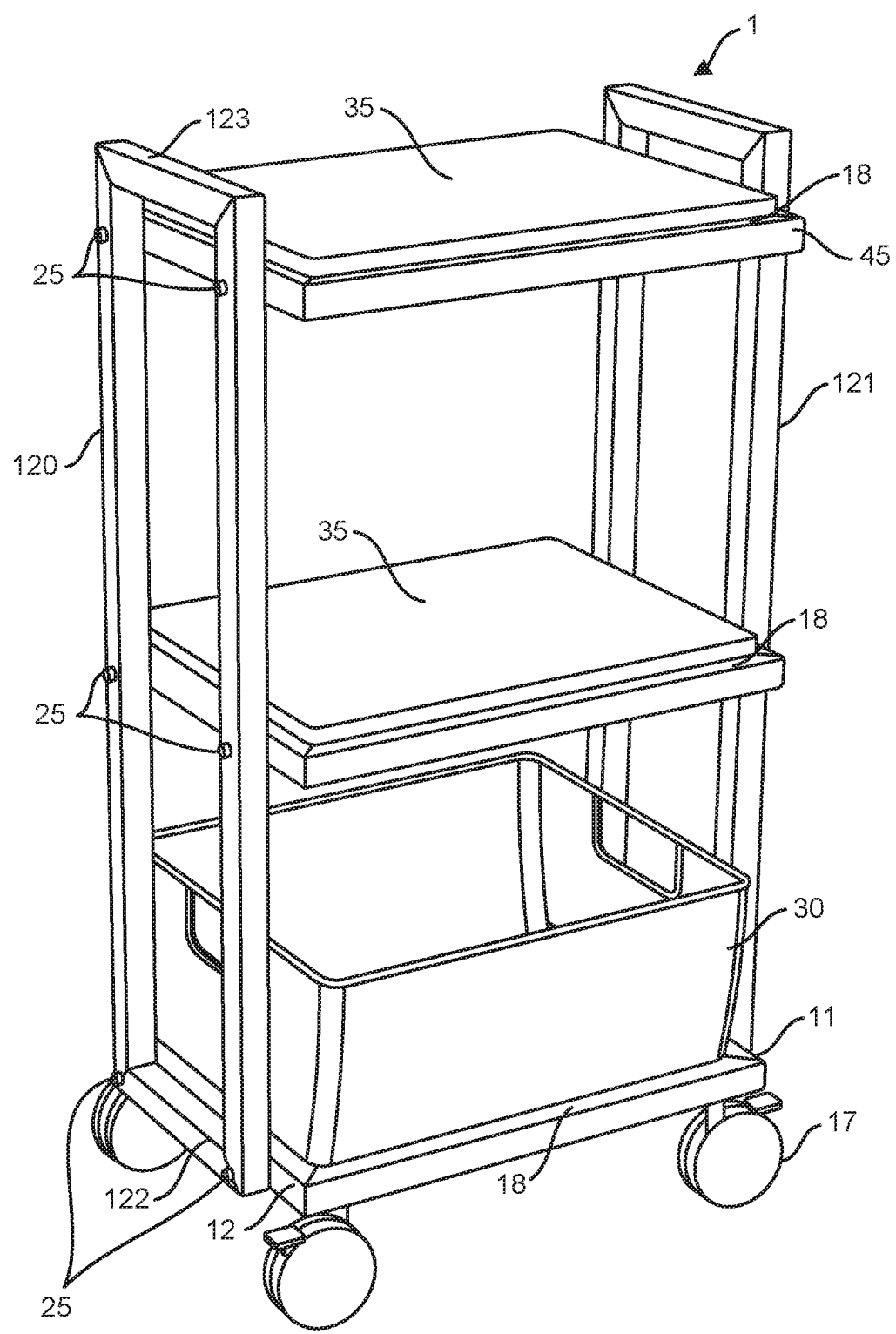
FIG. 8 is an elevated perspective view of a second embodiment of the cart system of the present invention having a basket accessory and two shelf accessories.
Figure 9:
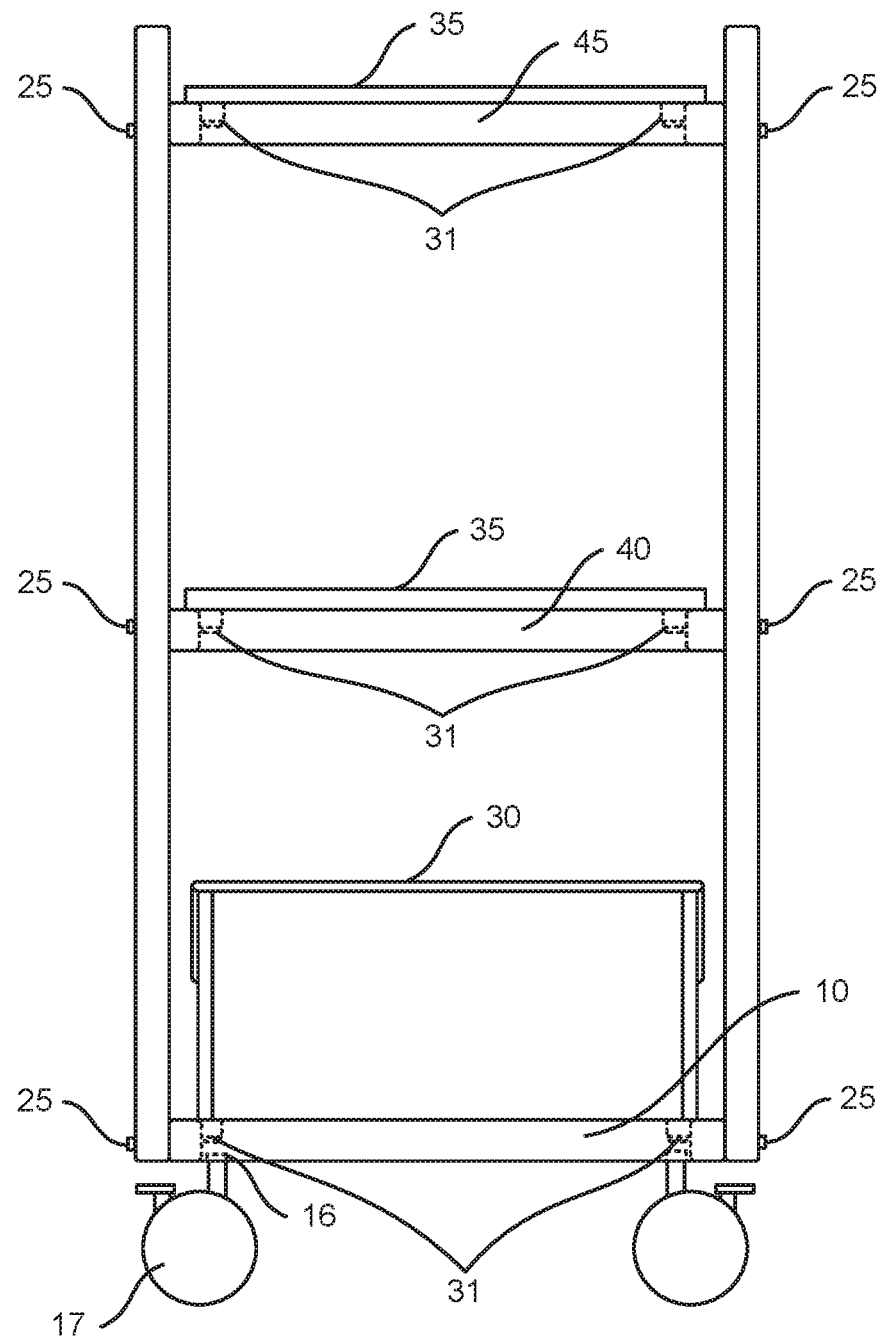
FIG. 9 is a side perspective view of the cart system according to the second with three levels.
Figure 10:
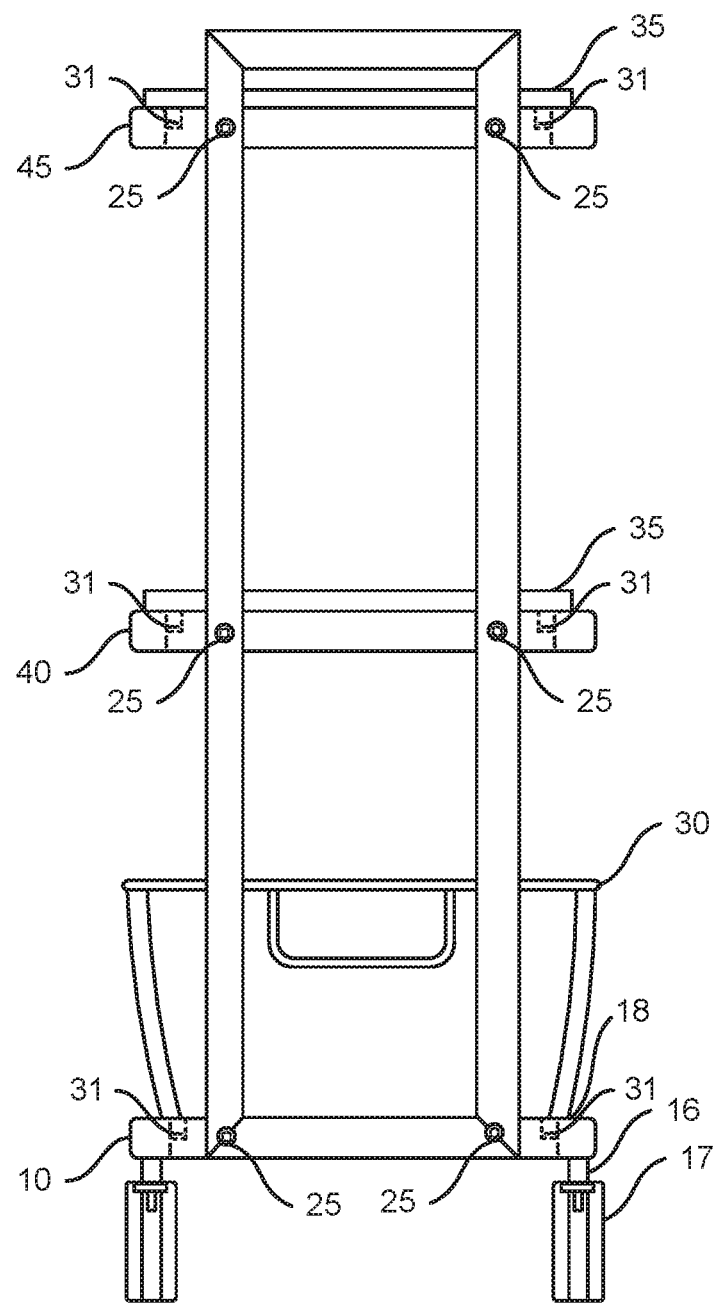
FIG. 10 is an end perspective view of the cart system of FIG. 8 with three levels.
Figure 11:
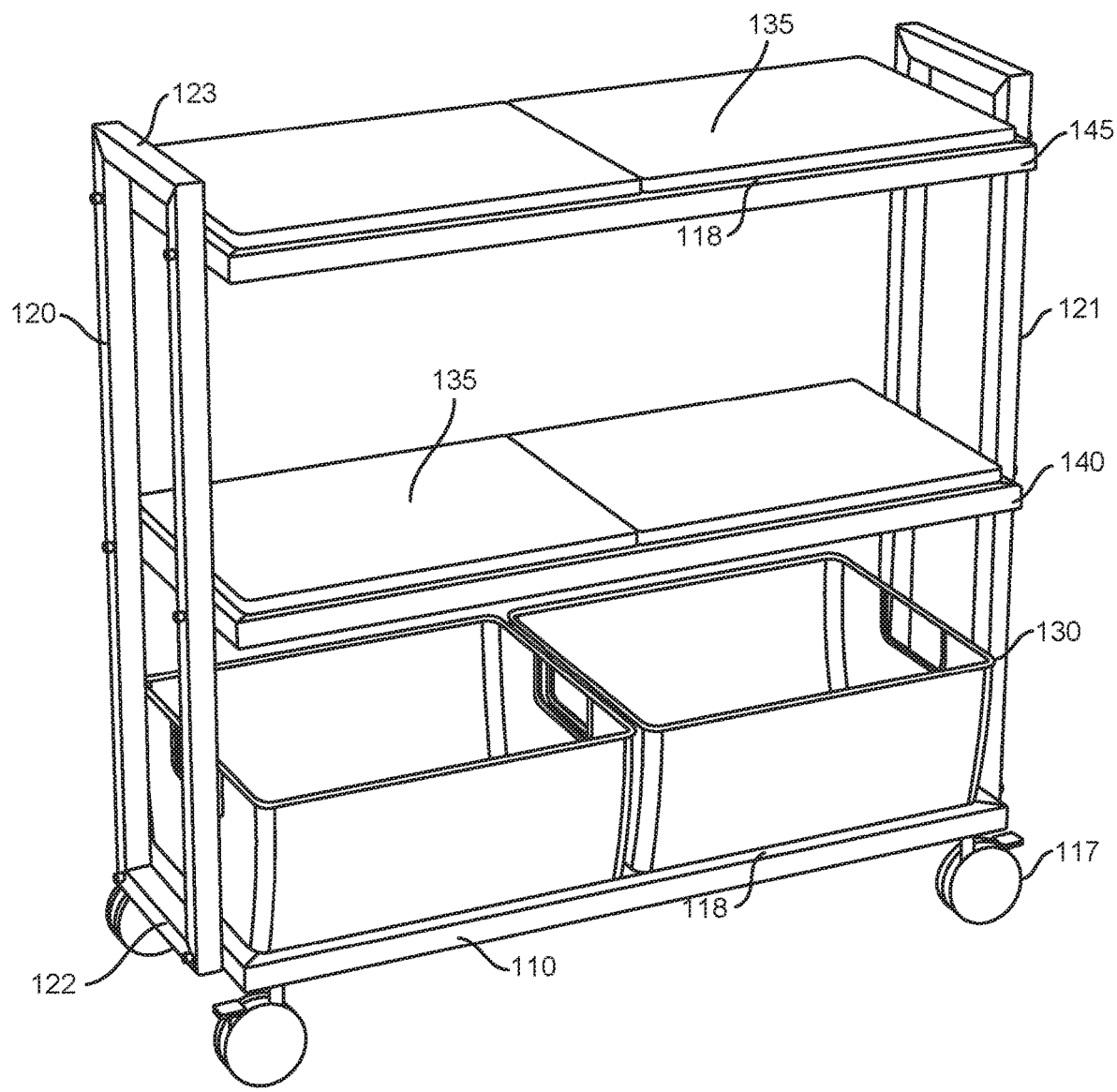
FIG. 11 is an elevated perspective view of the cart system having three levels but in a different embodiment where the cart system is twice as long as that shown in FIG. 8.
Figure 12:
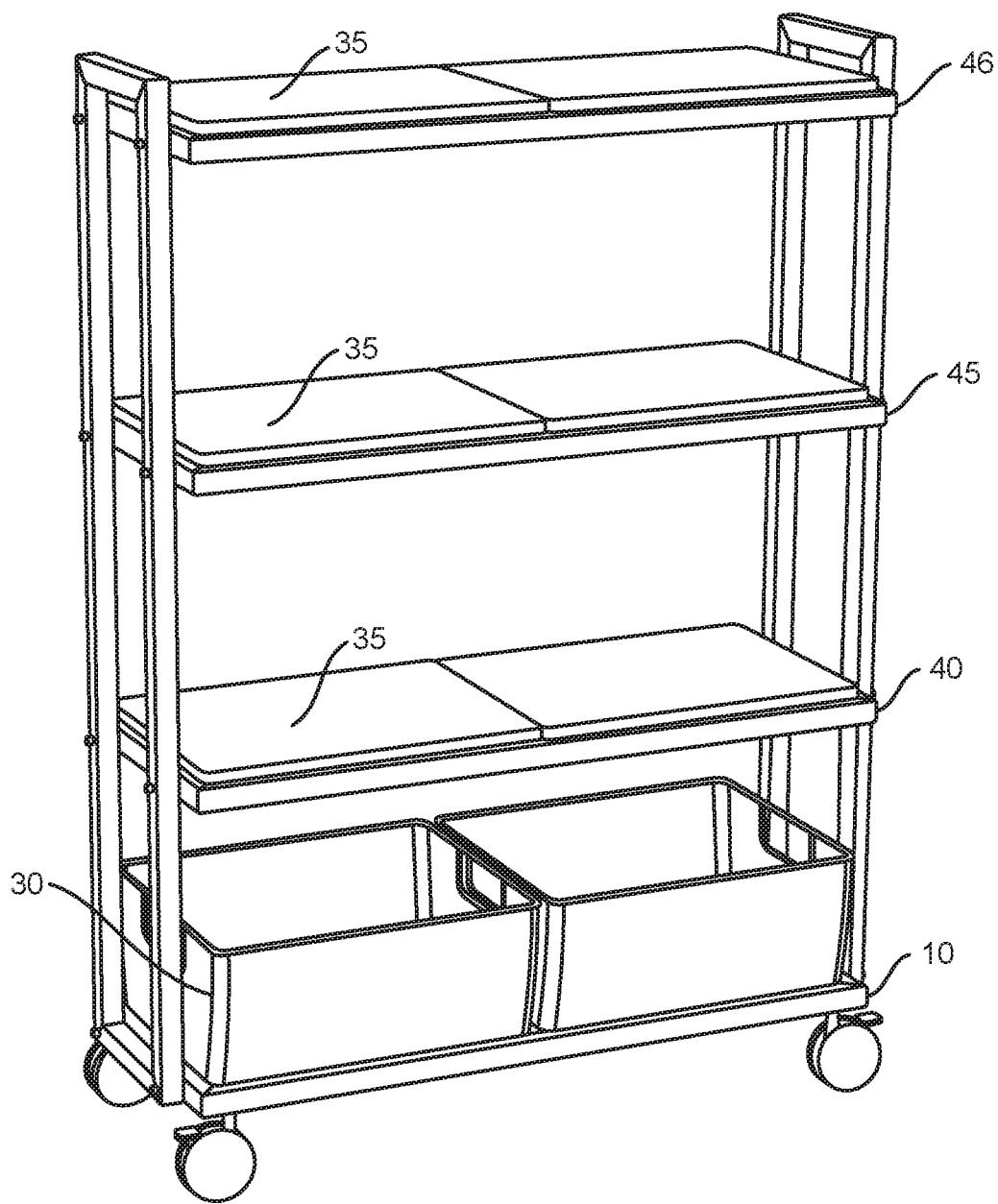
FIG. 12 is another elevated perspective view of the cart system of FIG. 11 but having four tiers or levels.
Figure 13:
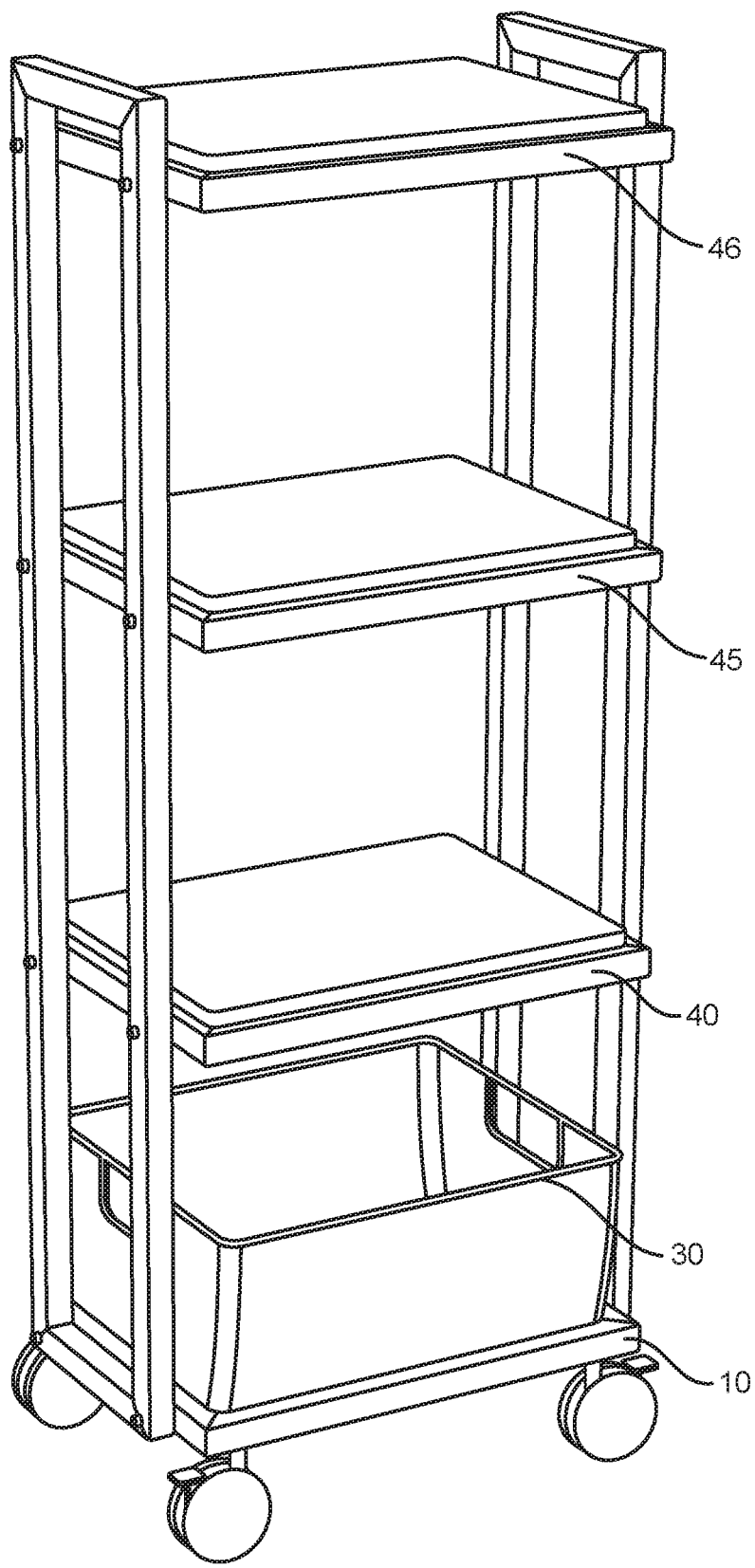
FIG. 13 is an elevated perspective view of a cart system in yet another embodiment being one accessory wide and four tiers high, including a single basket and three shelves.
Figure 14:
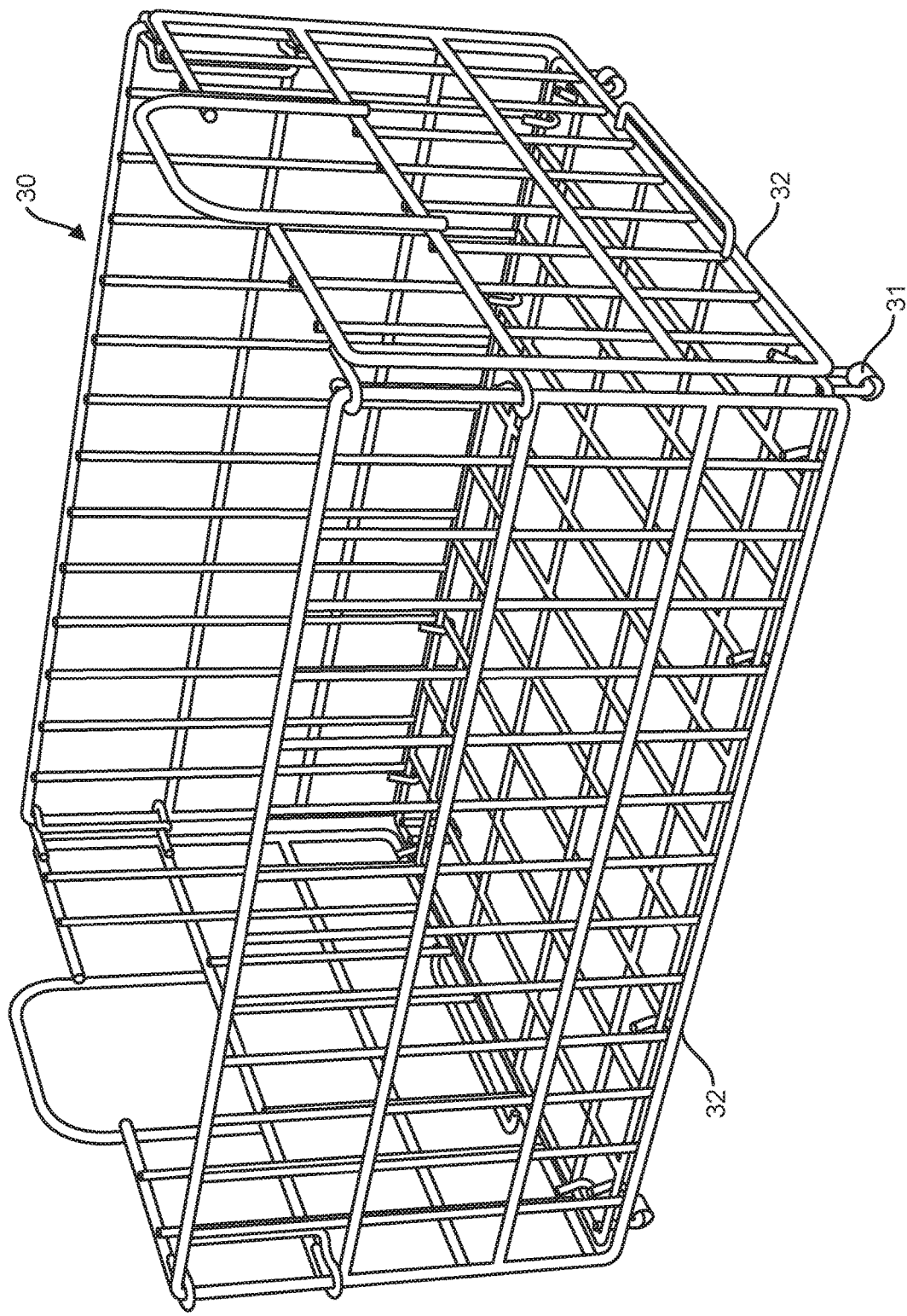
FIG. 14 is a perspective view of the basket accessory of the present invention.

In FIGS. 8 and 11 these end frame parts are correspondingly designated as 120, 121, 122, 123. These end frames are not designated in all of the additional configurations but it should be known that they can be configured to accommodate whatever number of accessory receiving frames are used.

As described above any variety of accessory can be added to the second accessory frame as it is identical in configuration and design to the accessory base frame 10. In other words, the second accessory frame 40 is the same shape and size as the accessory base frame 10 and will receive all the same accessories as the accessory base frame 10, thus providing an even larger variety of configurations for the cart system. It should also be noted as above that it is also possible to place two shelves side by side, or two baskets side by side, or two of any accessory side by side in any of the additional accessory frames with the simple addition of the cross connector 15. This cross connector 15 provides the additional support needed to hold and secure the additional shelves, baskets, or whatever accessory is added. It is basically a cross bar running from one side of the base frame to the other, as is shown in FIGS. 6 and 7.

Figure 35:
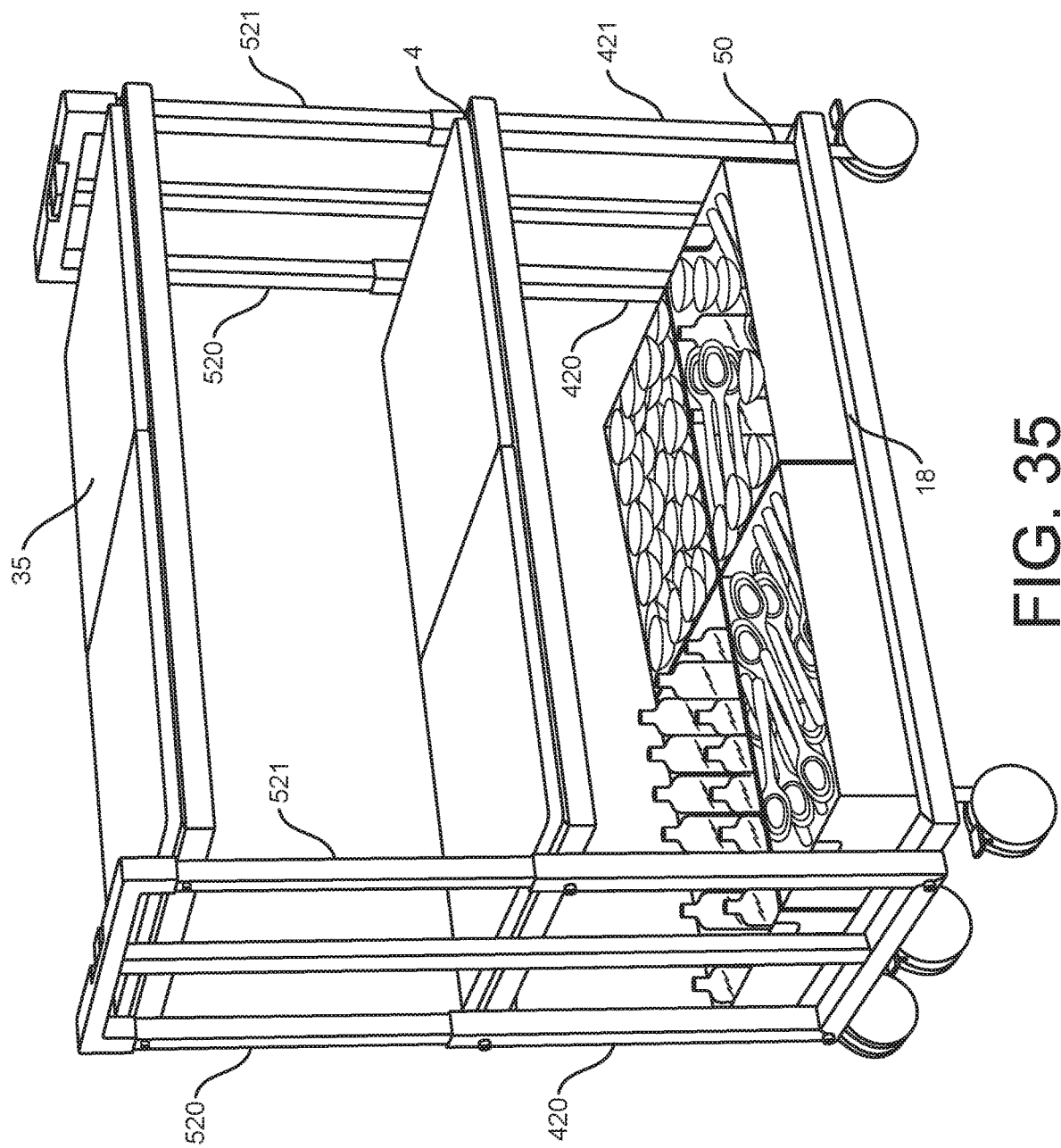
FIG. 35 is a perspective view of the cart system in an embodiment that is two by two accessories wide, with extendable end frames.

Along with the extra tiers that can be added it is also possible to have larger, wider accessory frames. They could be configured in any width whatsoever. As an example, the base frame could be twice as wide, as shown in FIG. 35, so that the accessories are in a 2 by 2 configuration. In this configuration, the cart 1 could have four baskets on the first tier, or two baskets and two shelves. Or the first tier could have the cooler, a bottle holder, and then two baskets. The second tier could then have a bottle holder, glass hanger, baskets, or any of the other accessories as described herein. This additional width obviously adds great configurability and numerous more orientations and options to the cart system. The system, instead of being twice as wide, could also feature connectors to secure two separate standard width units one to the other. Obviously, the width is not limited to that described but instead could be of any width, as long as the accessories are configured to work with the width used. These accessory frames could also utilize the same expandable technology as is described for the end frames above to expand the width of the frame.

As has been discussed, the system is configurable and it is also easily enlargeable, both in width and height. By simply adding or removing different end frames, or elongating or extending the end frames, the system can be taller or shorter, depending upon the type of end frame used. As can be seen from FIGS. 12-13 a user can easily have a system that is 4 tiers tall or taller if desired.

Additional Accessories.

Figure 20:
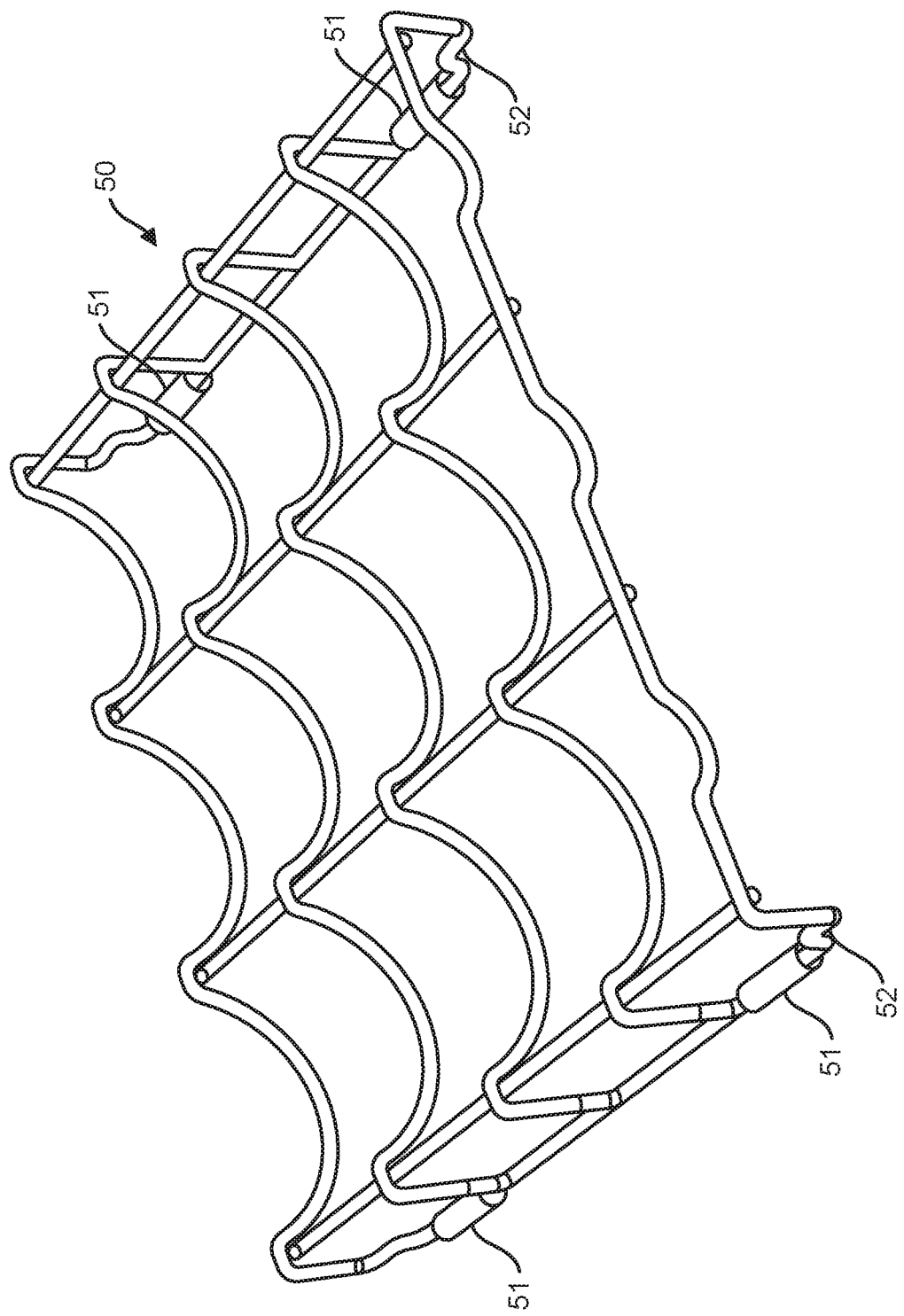
FIG. 20 a perspective view of the wire bottle rack accessory of the present invention.
Figure 21:
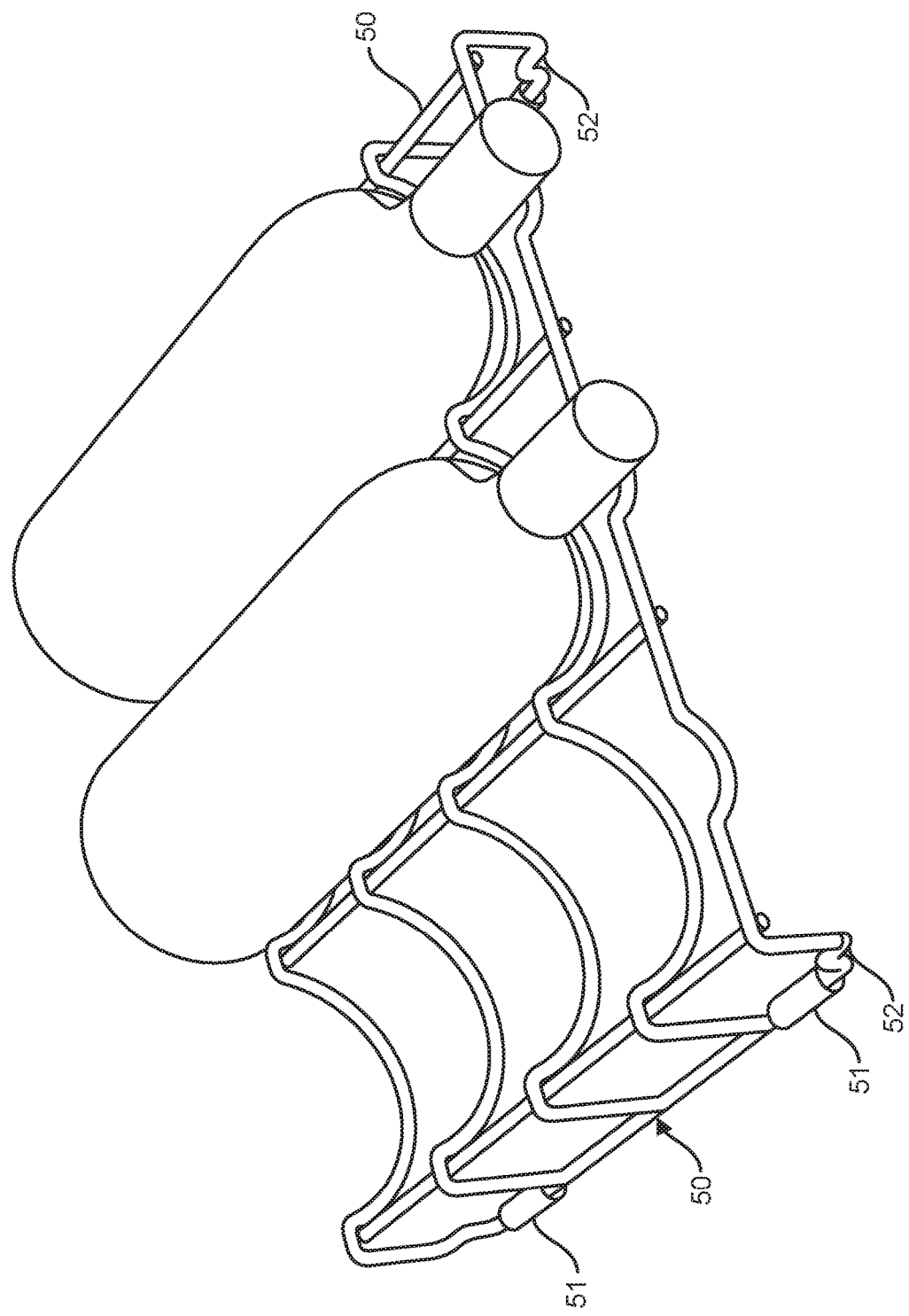
FIG. 21 is a perspective view of the wire bottle rack accessory as shown in FIG. 18 of the present invention with bottles in place.
Figure 22:
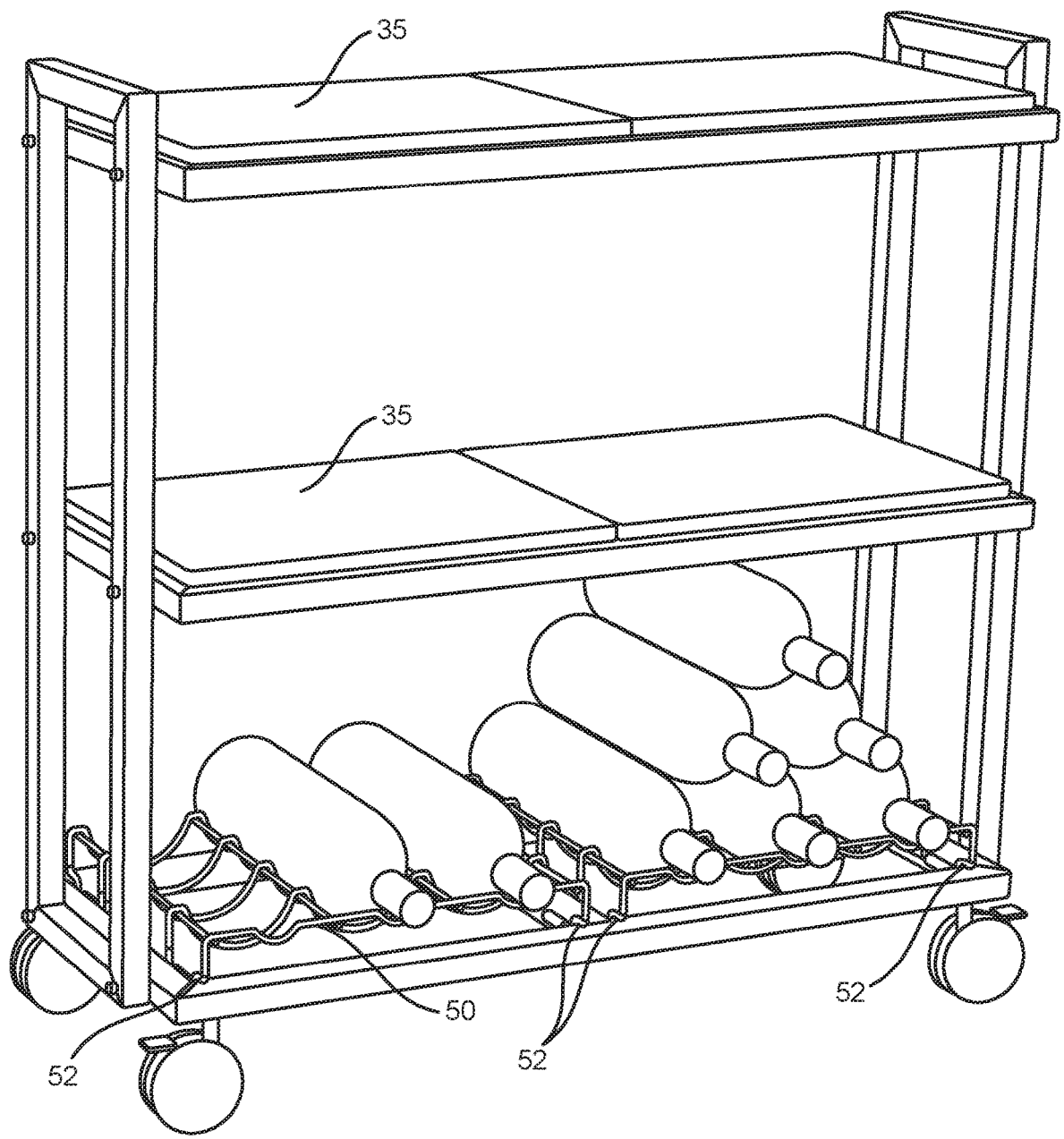
FIG. 22 is a perspective view of the another embodiment according to the inventive subject matter with the wire bottle accessory racks installed on the bottom accessory base frame and shelves installed on the second and third accessory frames.
Figure 25:
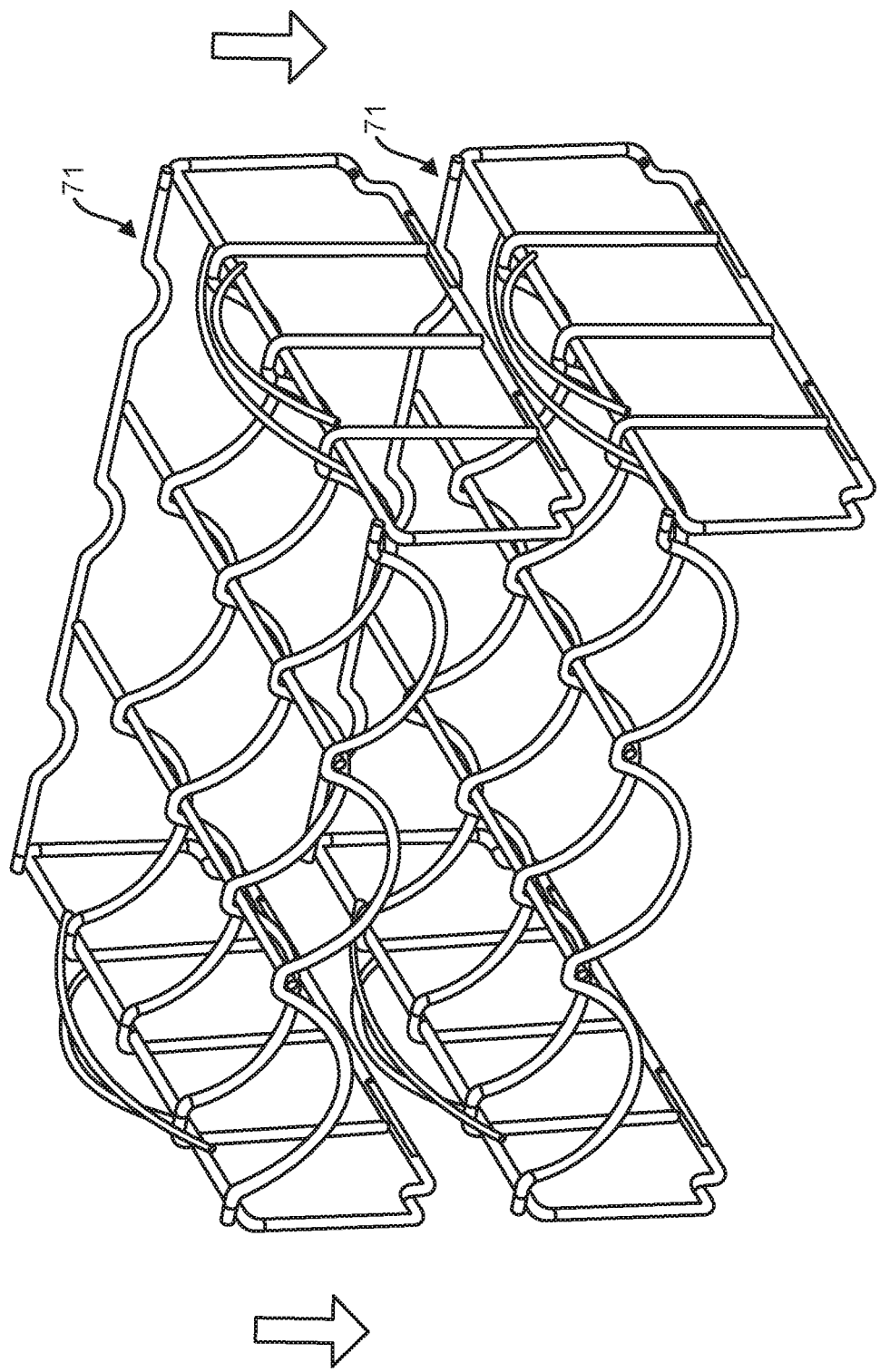
FIG. 25 is a perspective view of the bottle rack as a stackable, expandable accessory.
Figure 26:
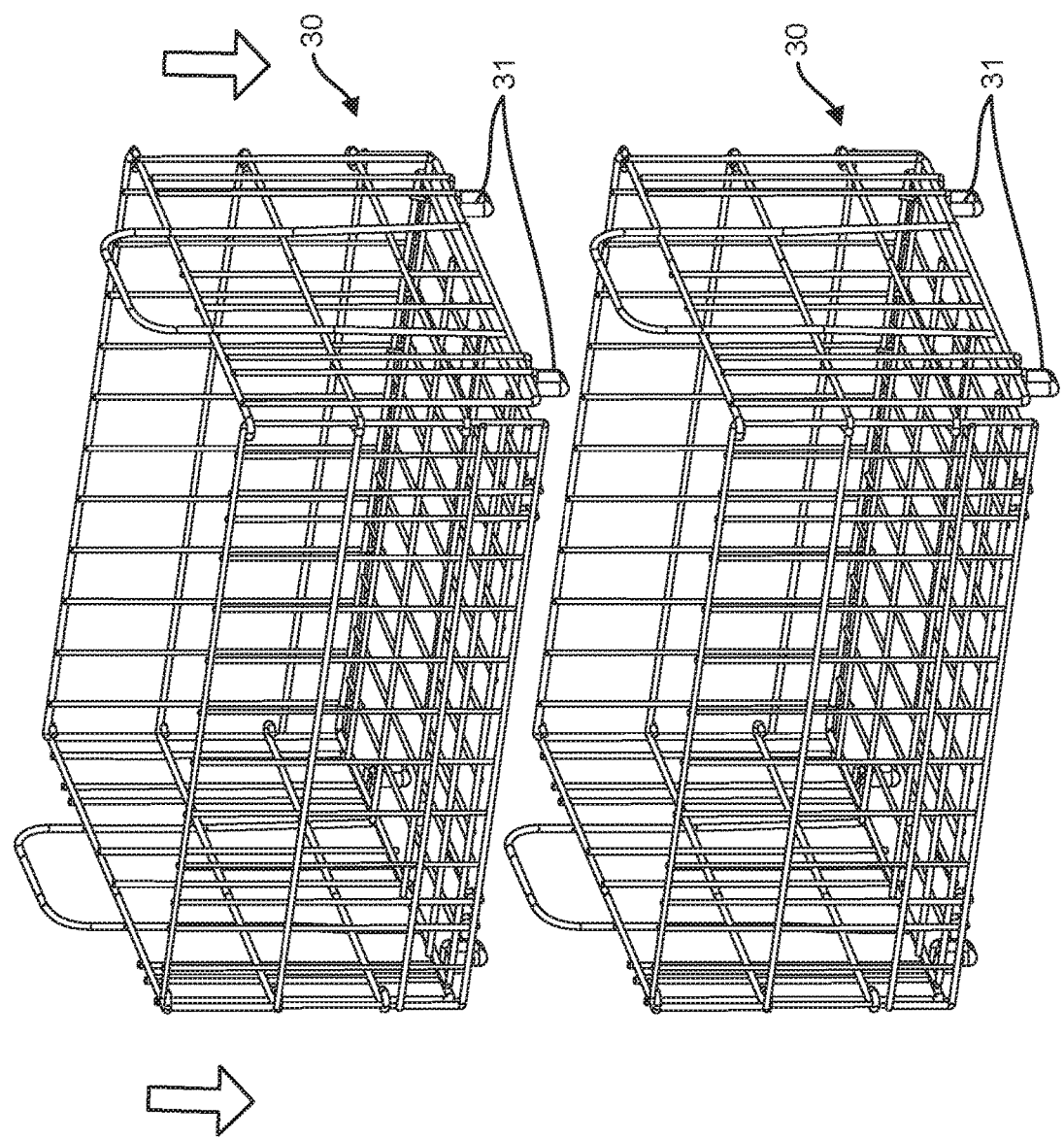
FIG. 26 is a perspective view of the basket as a stackable, expandable accessory.

In addition to the standard shelving and basket accessories configurable with this system a wide variety of other accessories that fit into the same accessory base frame 10 frame and second, third, fourth, fifth, or whatever tier accessory frames are also available. For example, FIGS. 20, 21 and 22 show a wire wine rack or bottle rack 50. This accessory is configured so that the base of the rack 50 matingly fits in the internal perimeter 2 of the accessory base 10 or in the internal perimeter 2 of the second accessory frame 40 or within any other additional accessory frame's internal perimeter rim that might be added to the cart 1 system. It then has a corner seating portion 52 that rests on the internal mounting portion 4 near the corners 3. This portion of bottle rack 50 fits snugly within the corners 3 of the accessory frames and prevent the rack from moving, thus securing it in place using corning seating portion 52. It could also have rubber piping 51 placed about the bottom of the rack where it rests against the sides of the accessory frames to cushion the rack and to prevent damage to bottles. This bottle racking system can also be stackable, as shown in FIG. 25, thus providing additional portion for bottles. As with the basket system, these bottle racks can be used both in and out of the cart system.

Figure 23:
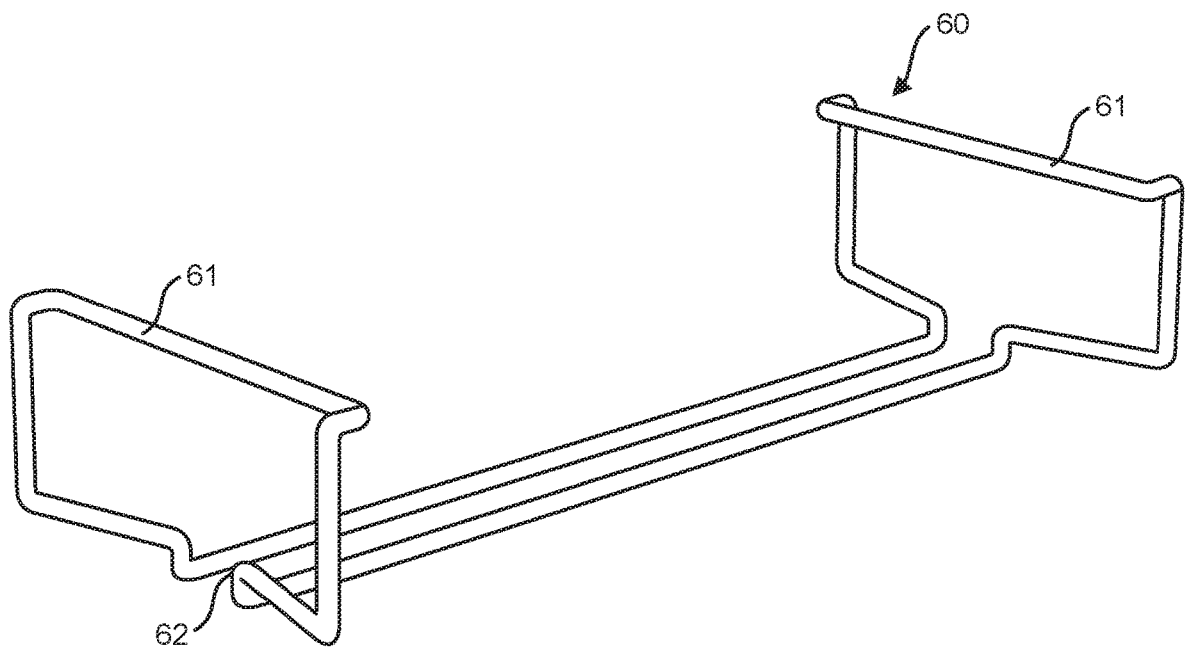
FIG. 23 is a perspective view of a glass hanger of the present invention.

The system could also have a glass hanger 60. This glass hanger is seen in FIGS. 23 and 24. This accessory is configured so that hanger edge 61 matingly fits on the external mounting portion 5 of the second accessory frame 40 or on the external mounting portion 5 of the third accessory frame 45 or on any other additional accessory frame's external mounting portion 5 that might be added to the cart 1 system. The glass hanger then is suspended from the external mounting portion 5 so that glasses can be hung from a hanger channel 62. The external mounting portion 5 is imperative for this accessory's functionality. This external mounting portion, or perimeter rim also provides a pleasing look for the cart 1 when the accessories are in place.

Figure 27:
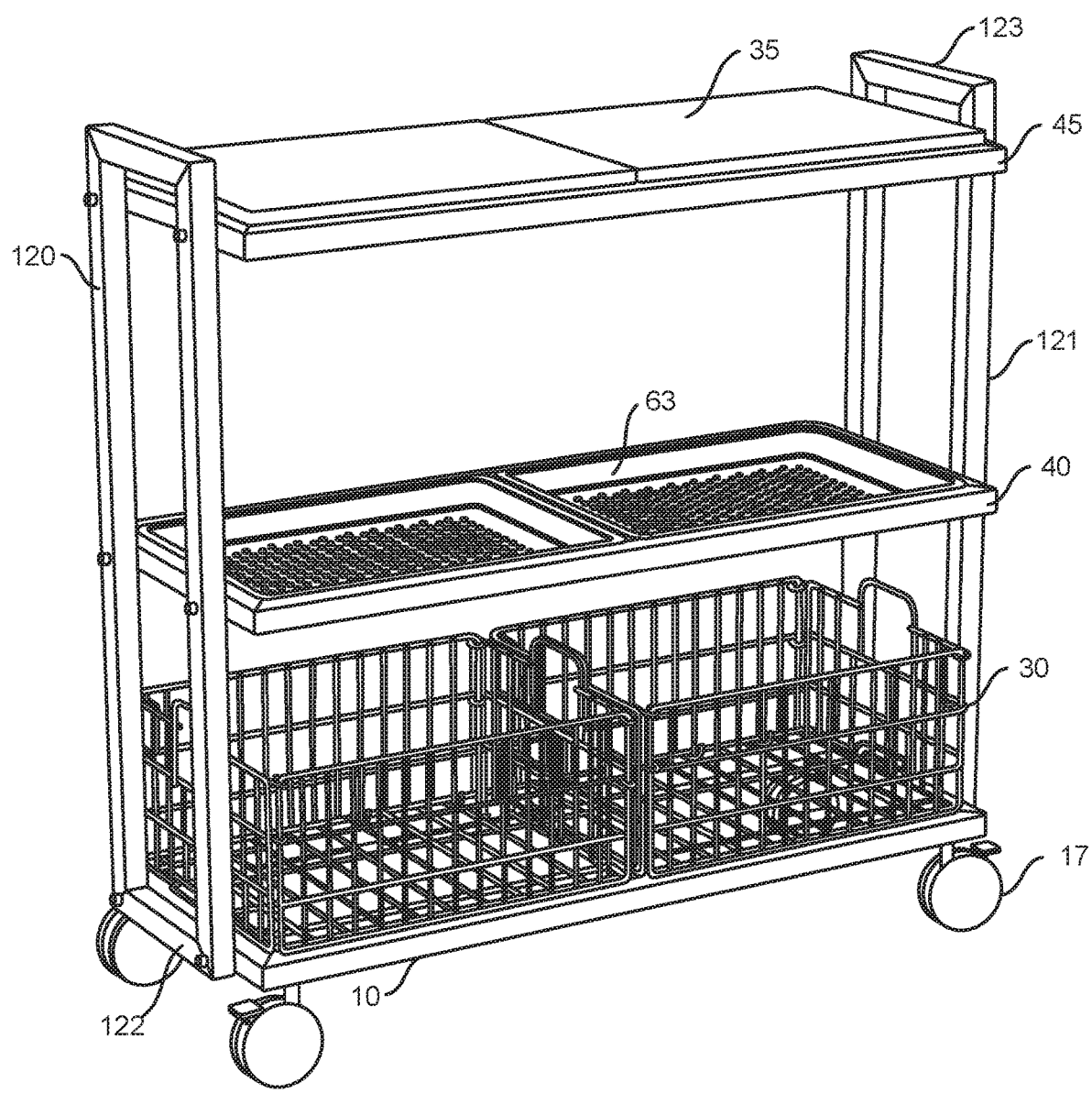
FIG. 27 is a perspective view of the cart system having three accessory accepting frames where the bottom frame is equipped with baskets, the second equipped with a pocketed shelf, and a third with shelves.

Another accessory is a shallow drawer in the shelf as is seen in FIG. 27. This drawer could be used to hold silverware, beads, or anything that might roll off a flat shelf. This accessory is configured the same as the shelf but is depressed in the center portion.

Figure 28:
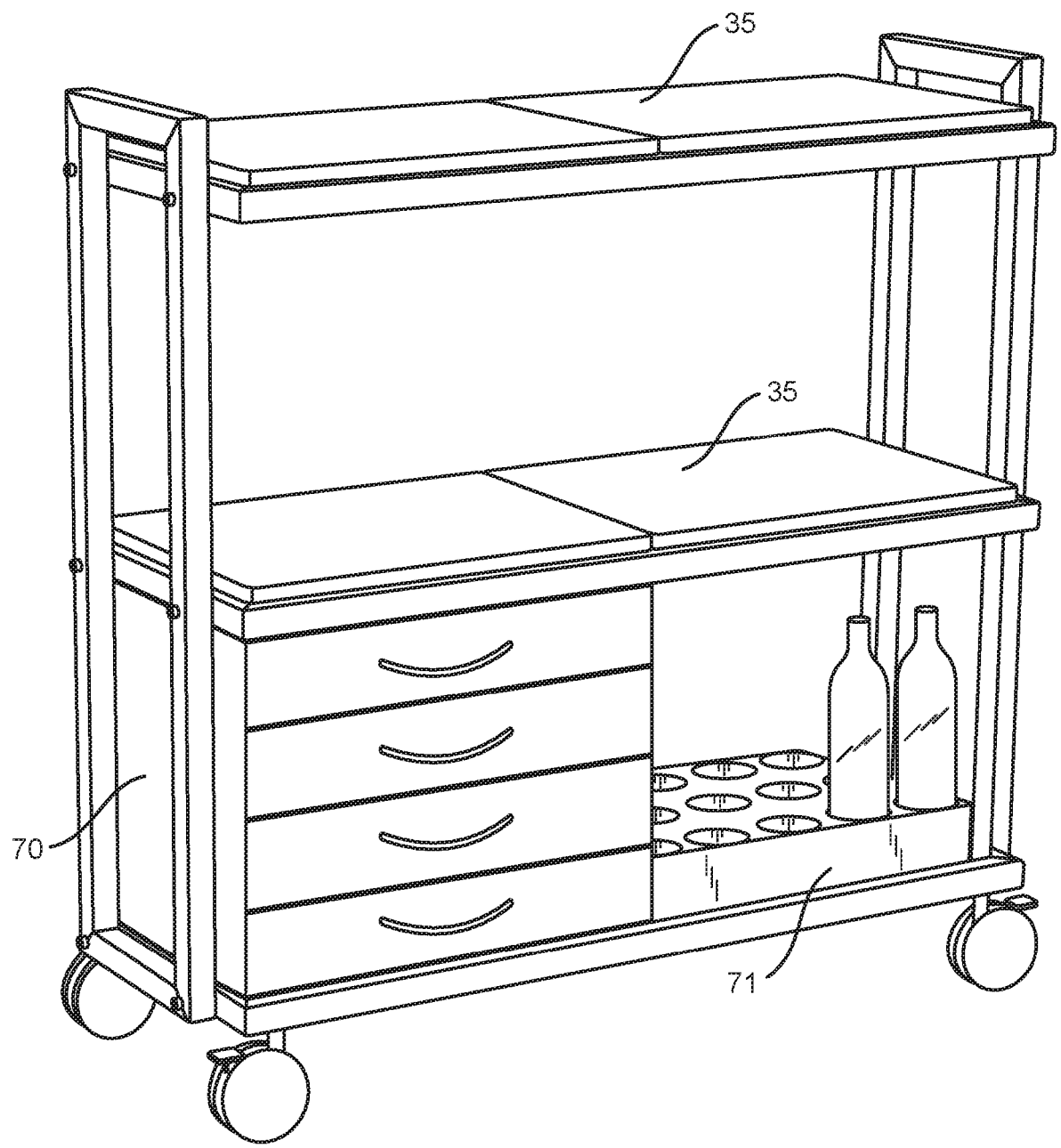
FIG. 28 is a perspective view of the cart system as shown in FIG. 1 having a first accessory accepting frame equipped with a drawer accessory and a bottle accessory; a second accessory frame with shelves; and a third accessory frame with shelves as well.

FIG. 28 shows a configuration with two other accessories. The first is a drawer system. This accessory has the same bottom protrusions or feet 31 that fit into the corners 3, just like those for the shelves and baskets. In addition to this drawer systems ability to easily fit into the cart system it can also be removed and used as a stand-alone drawer system, such as for a college student dorm room, in a kitchen, bedroom, garage, or any other place. The right side of the cart 1 in FIG. 28 is a bottle holder. This also has a bottom that features the same bottom protrusions or feet 31 that fit into the corners 3, just like those for the shelves and baskets.

Figure 29:
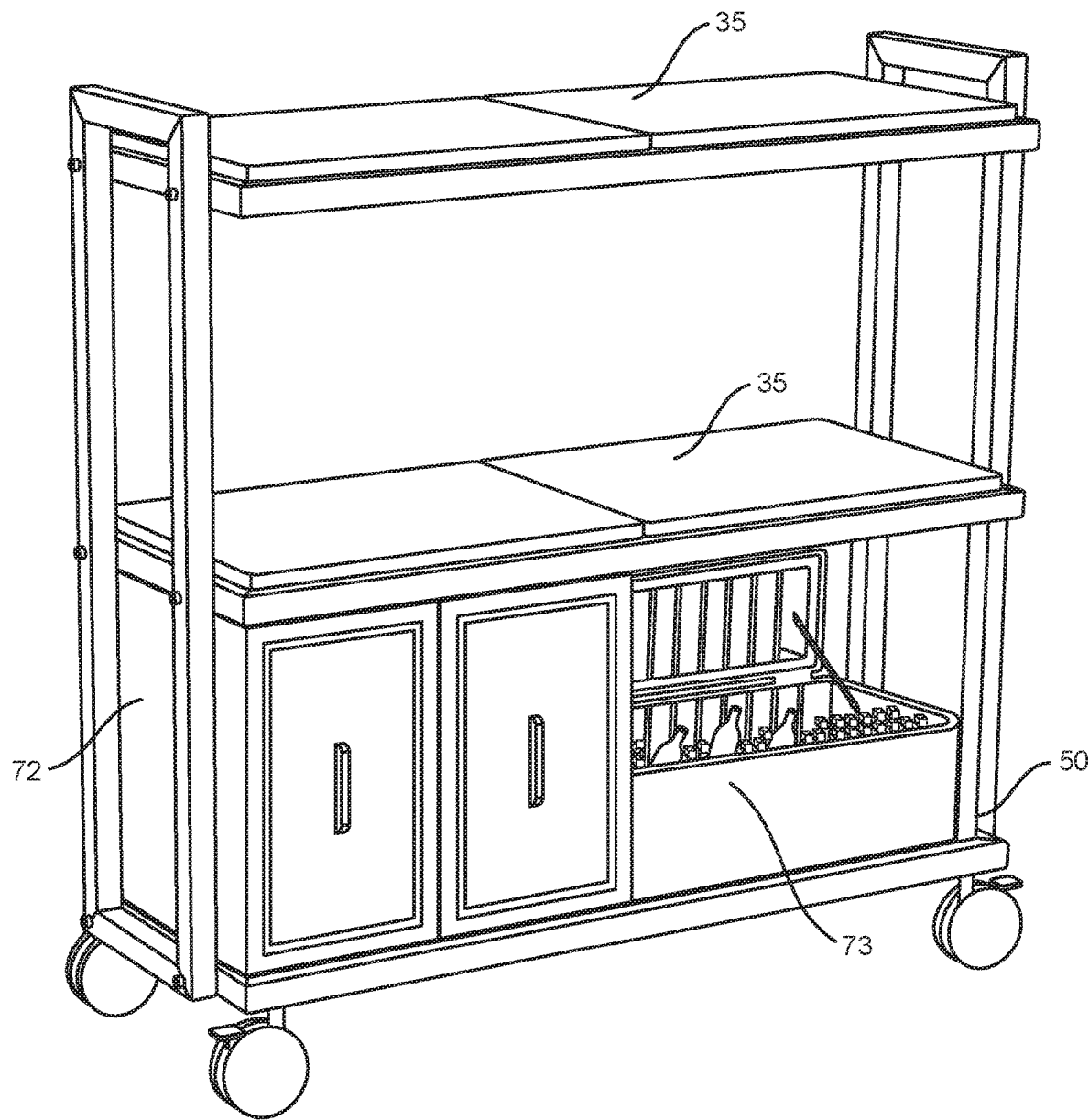
FIG. 29 is a perspective view of the cart system as shown in FIG. 1 having a first accessory accepting frame equipped with a two door cabinet accessory and a cooler or ice chest accessory; a second accessory frame with shelves; and a third accessory frame with shelves as well.

FIG. 29 shows two more possible accessories. The first is a cabinet unit 72, as shown on the left side of the cart system. This particular embodiment has two doors that open and close, that could be lockable, and that open into either an empty unit or a unit with shelves. Again, this accessory has the same bottom protrusions or feet 31 that fit into the corners 3, just like those for the shelves, baskets, drawers or bottle holder. The right side of the cart system 1 as shown in FIG. 29 has a cooler 73 or ice chest. Again, the ice chest 73 features the same bottom protrusions or feet 31 that fit into the corners 3, exactly like those for the previously mentioned accessories.

Figure 30:
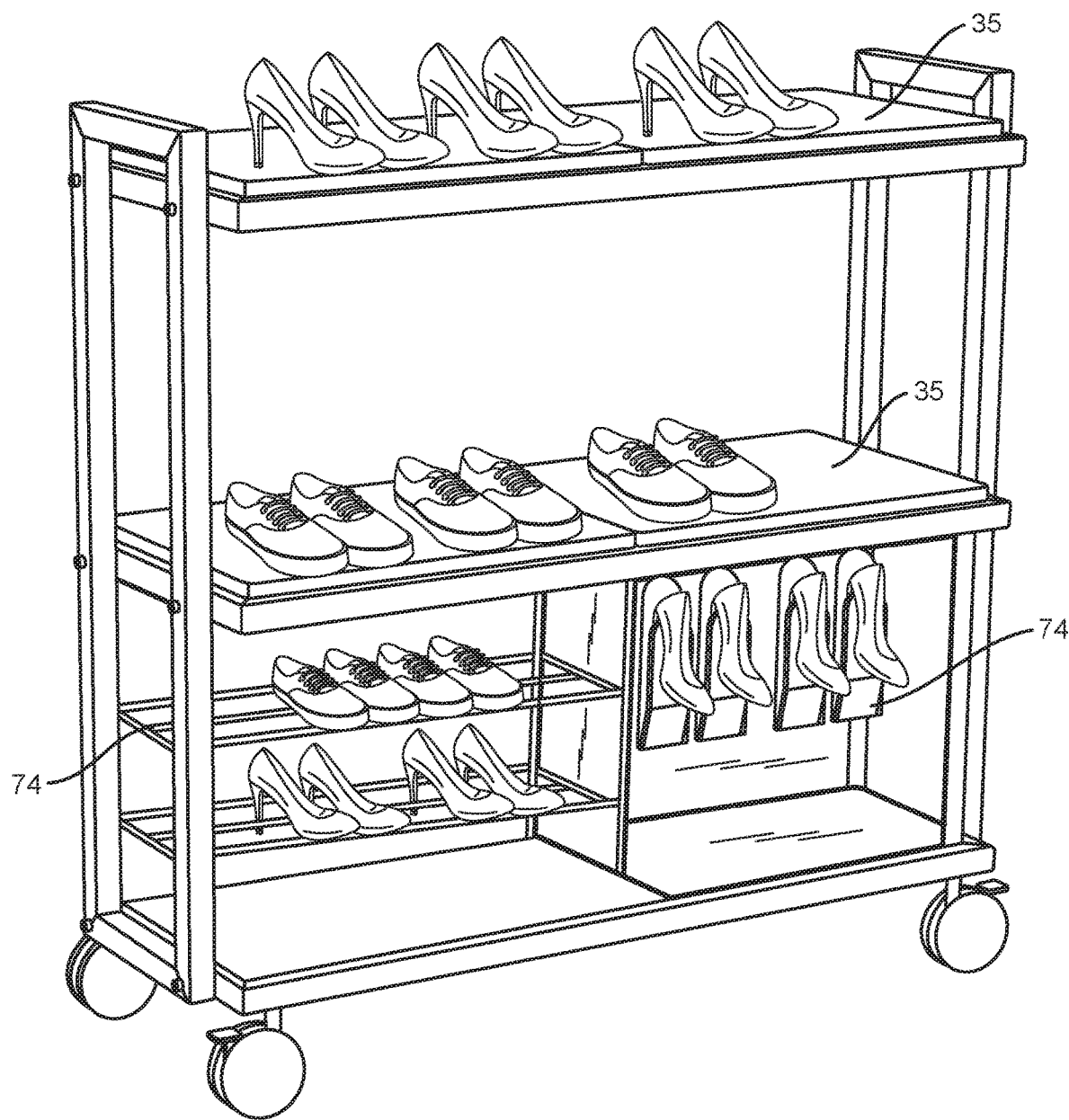
FIG. 30 is a perspective view of the cart system as shown in FIG. 1 having a first accessory accepting frame equipped with a horizontal shoe holding accessory and a vertical shoe holding accessory; a second accessory frame with shelves; and a third accessory frame with shelves as well.

FIG. 30 shows another embodiment of an additional accessory and that is a variety of units designed to hold shoes 74. The horizontal shelves are part of a lower, base unit that is affixed in approximately the same manner as the other accessories. That is, it has the same bottom protrusions or feet 31 that fit into the corners 3, just like those for the shelves and baskets. The right side also has a vertical hanging shoe holder that again has a base unit that fits into the perimeter and has the same bottom protrusions or feet 31 that fit into the corners 3, just like those for the shelves and baskets.

Figure 31:
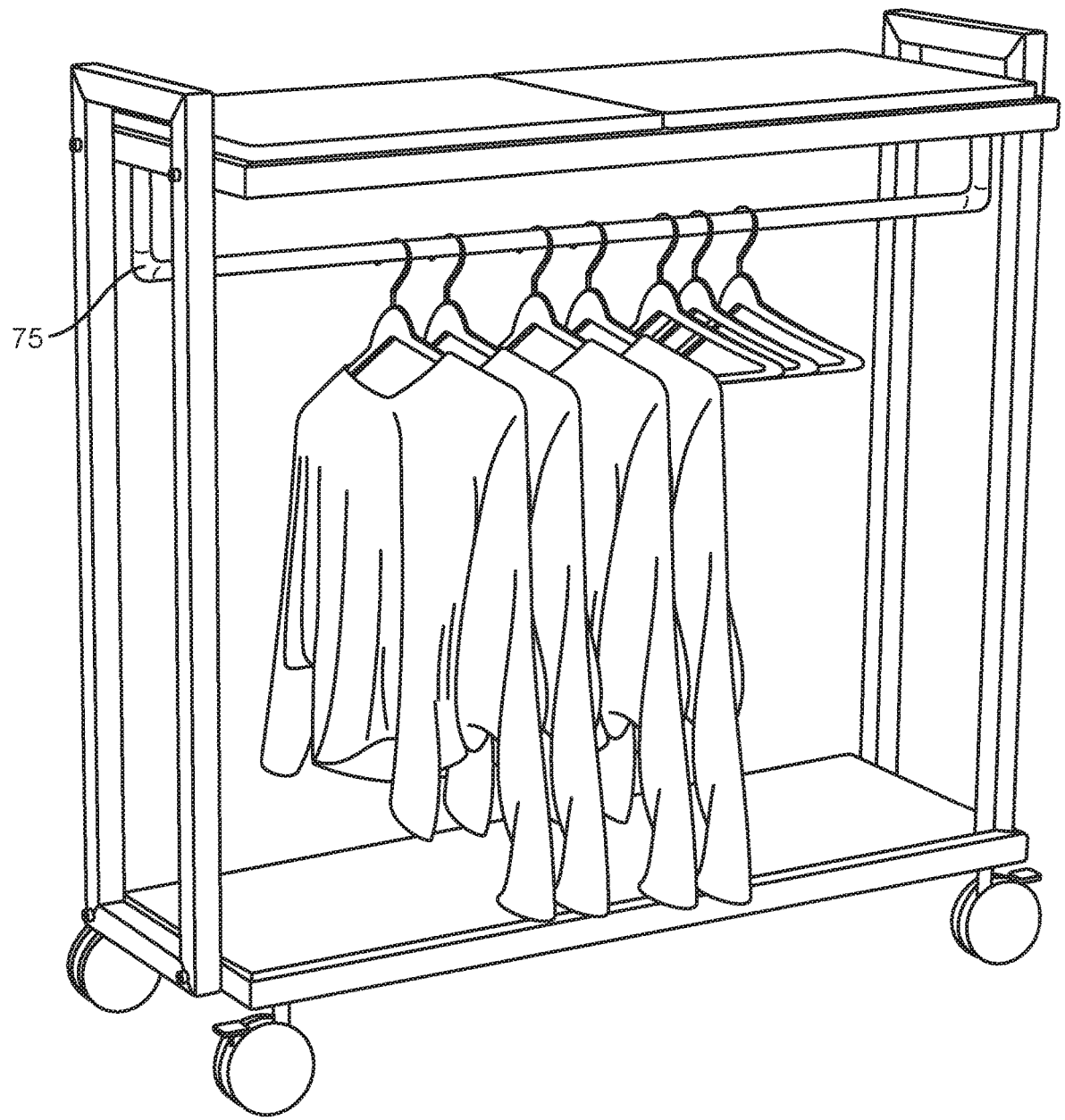
FIG. 31 is a perspective view of the cart system as shown in FIG. 1 having a first accessory accepting frame equipped with a shelf; a second accessory frame with shelves; and a hanger system configured along with the shelf.

FIG. 31 is a hanger system 75. This accessory can be configured to extend from the bottom of the shelves that that have the same bottom protrusions or feet 31 that fit into the corners 3, just like those for the shelves and baskets from above. Obviously, there are multiple ways to configure and have the hanger system 75.

Figure 32:
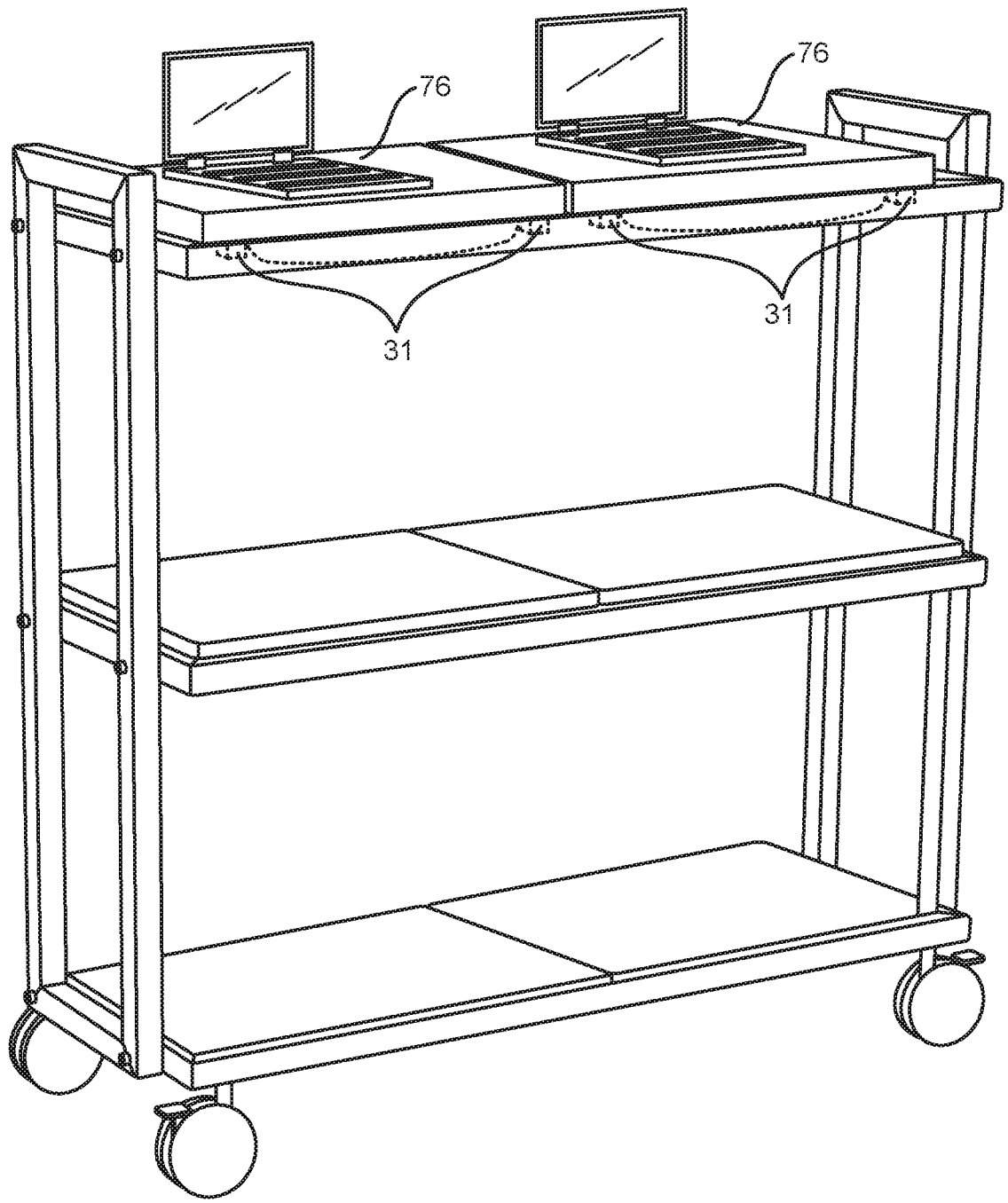
FIG. 32 is a perspective view of the cart system as shown in FIG. 1 having a first accessory accepting frame equipped with shelves; a second accessory frame with shelves; and a third accessory frame with removable desk pillows.

FIG. 32 is still another accessory that is a pillow bottom desk 76. Presently there are pillow bottom portable desks in the market designed to be used in bed, on a chair, or when sitting on a couch. These pillow bottom desks have a pillow on the bottom of a solid surfaced portable flat surface that can be used to write on or to place a laptop upon. As they exist now, the user can use the pillow bottom desk and then, when it is not in use, it must be placed in a storage area or out of the way of the user. With the present cart system 1 the pillow bottom desk 76 has the same bottom protrusions or feet 31 that fit into the corners 3, just like those for the shelves and baskets, on the outside of the pillow portion. Thus, when the user is not using the pillow desk 76 as a portable desk it can be placed in the cart system 1 and thus forms a shelf or flat surface. In this way, the pillow desk 76 serves two purposes and does not have to merely be stowed away, but can continue to be used as part of the cart system 1.

Figure 33A:
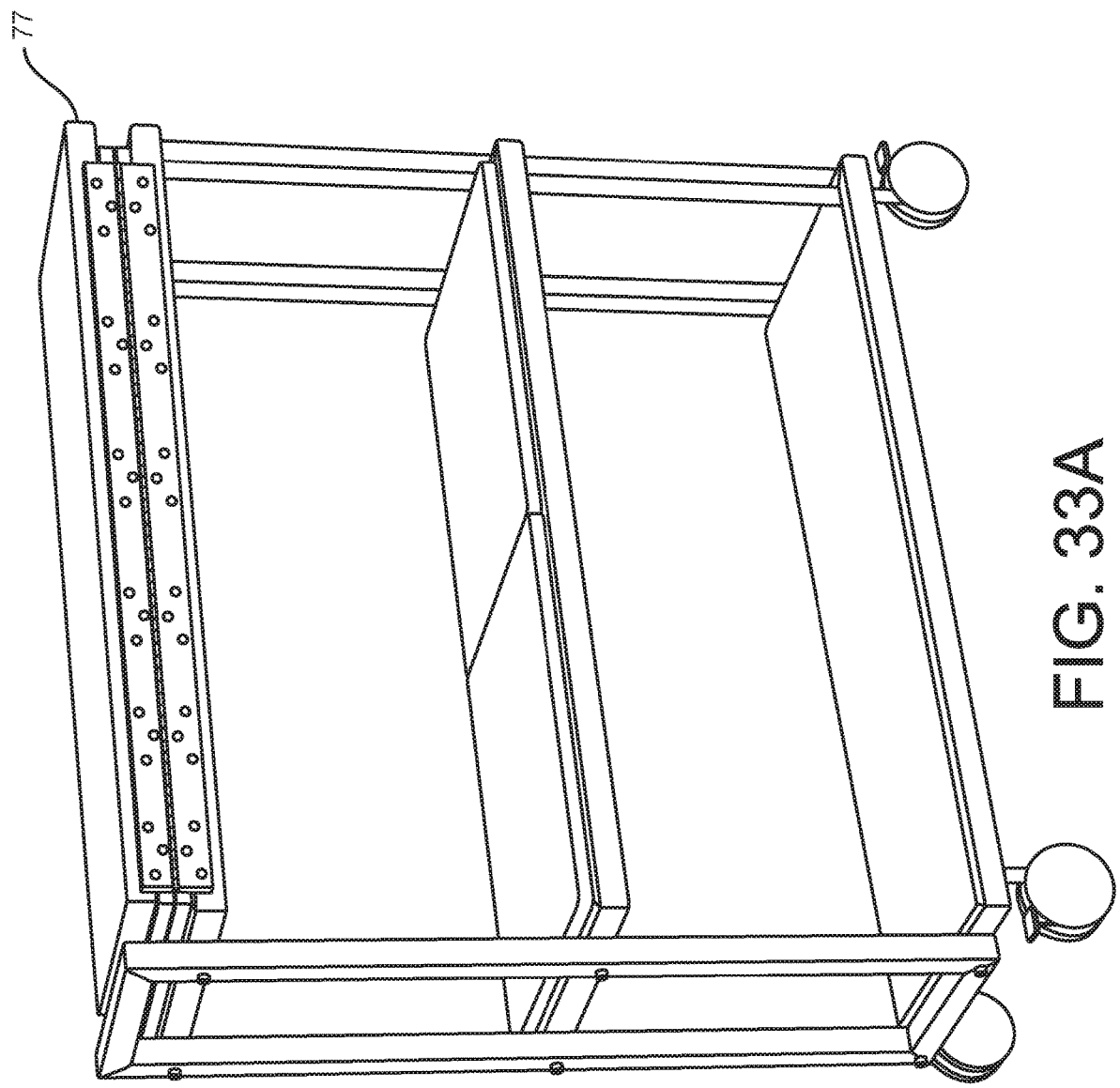
FIG. 33A is a perspective view of the cart system having an expandable desk accessory in the top accessory receiving frame where the desk is folded onto itself.
Figure 33B:
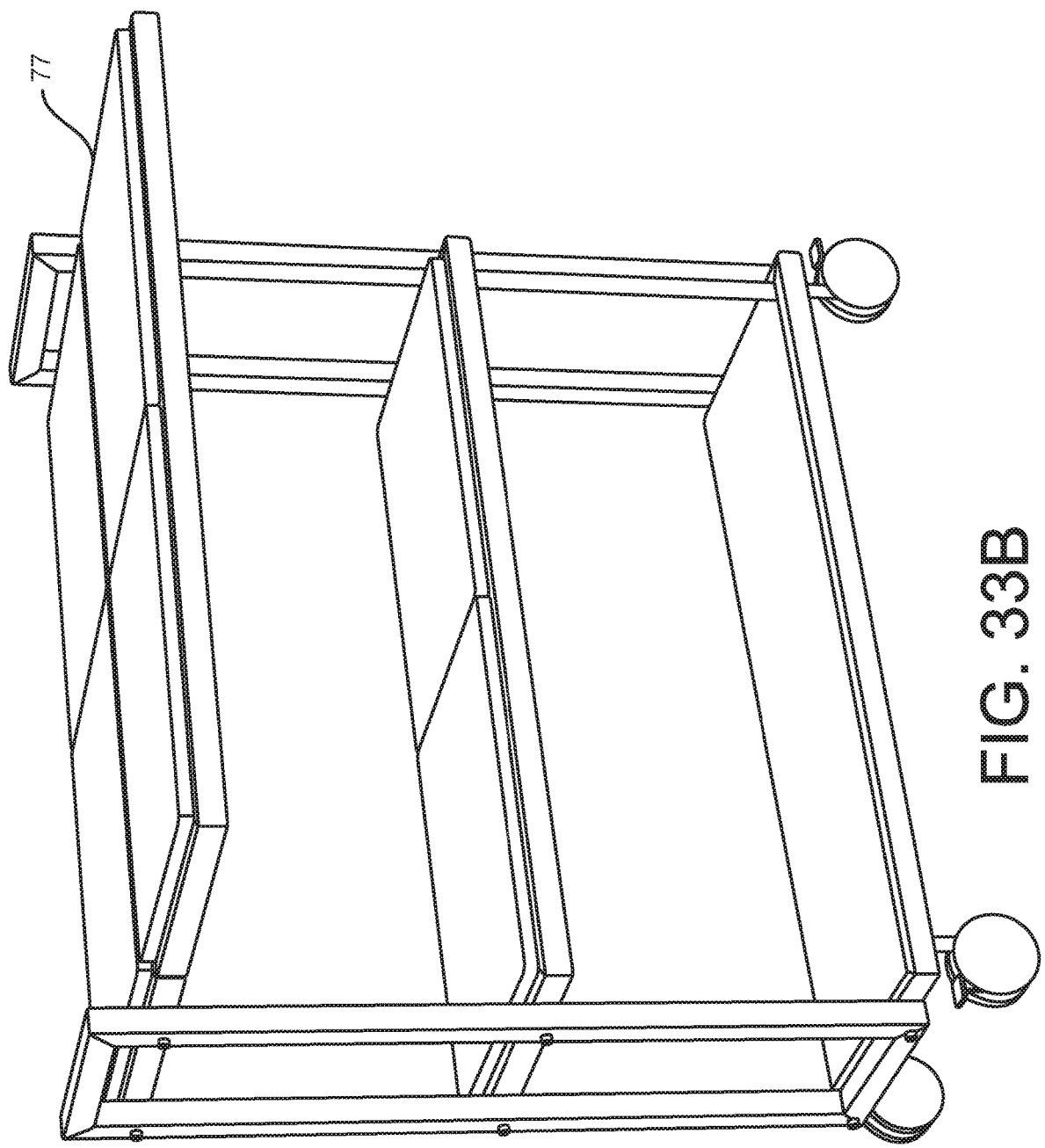
FIG. 33B is a perspective view of the cart system having the expandable desk accessory with the desk expanded and opened.

Yet another embodiment is shown in FIGS. 33A and 33B. This configuration shows an expandable desk system. In this embodiment, the expandable desk accessory 77 fits into the cart system 1 and has the same bottom protrusions or feet 31 that fit into the corners 3, just like those for the shelves and baskets. However, instead of a simple, flat shelf it has a shelf with an additional portion that can be extended. In the embodiment shown in FIGS. 33A and 33B, the shelf that is inserted into the cart system 1 has a hinge on at least one side and an additional flat portion that can be folded out to create and form a desk. When folded out it will double the useable portion of the shelf and thus creates a desk portion.

As noted above, it is understood that it is possible to place any of the accessories side by side in the same frame with the simple addition of the cross connector 15. This cross connector 15 provides the additional support needed to hold and secure the additional accessories. It is basically a cross bar running from one side of the base frame to the other, as is shown in FIGS. 6 and 7.

FIGS. 34A and 34B show the cart system with end units that are expandable. In this way the user can make the cart either high or low depending on the desired application.

It is to be expressly understood that other embodiments are considered to be within the scope of the present invention as set forth in the claims. Moreover, component configurations and combinations of embodiments may diverge from the embodiments shown and described. Thus, the scope of the present invention includes various substitutions and assemblies among the versatile and configurable cart systems beyond the particular embodiments illustrated and specified herein.

It is therefore contemplated that other embodiments not illustrated in the drawings or described herein are considered to be within the scope of the present invention as set forth in the claims. Accordingly, configurations and combinations of the components of the cart system shown and described not specifically shown may diverge from those specified herein. The scope of the present invention thus includes any equivalent configuration or combination of the embodiments described and elements claimed.

The invention claimed is:

1. A configurable cart system comprising:
   an accessory receiving open centered base frame including:
      a bottom;
      an external perimeter;
      an internal perimeter framing said open center; and
      a top having a mounting portion between said external perimeter and said internal perimeter;
   at least one accessory dimensioned for use with said accessory receiving base frame, wherein said at least one accessory includes:
      an accessory bottom;
      a resting portion on said accessory bottom that matingly rests on said mounting portion of said accessory receiving base frame;
      at least two protrusions projecting from at least two different points on said accessory bottom; wherein said protrusions are positioned on said accessory bottom so that said protrusions abut said internal perimeter of said open centered receiving frame.

2. The configurable cart system of claim 1, wherein said at least one accessory has four corners and at least one protrusion projecting from each of said four corners.

3. The configurable cart system of claim 2, further comprising:
   a first end frame;
   a second end frame; and
   two or more open centered accessory receiving frames; wherein
      said two or more open centered accessory receiving frames are securely positioned and affixed above said open centered accessory receiving base frame via said first end frame and said second end frame; and wherein
      said two or more open centered accessory receiving frames have an internal perimeter corresponding to the internal perimeter of said accessory receiving base frame such that said two or more accessory receiving frames are configured to receive said at least one accessory.

4. The configurable cart system of claim 3, wherein said open centered accessory receiving base frame and said two or more open centered accessory receiving frames include a cross-connector so that said open centered receiving frames can receive more than one accessory.

5. The configurable cart system of claim 3, further comprising at least one or more feet attached to said bottom of said accessory receiving frame.

6. The configurable cart system of claim 5, wherein said feet are casters.

7. The configurable cart system of claim 3, wherein said first and said second end frames are expandable.

8. The configurable cart system of claim 3, wherein said at least four accessory receiving frames are mounted in a two by two configuration.

9. The configurable cart system of claim 3, wherein said at least one accessory is selected from the group consisting of a basket, a shelf, a shallow drawer shelf, an horizontal bottle rack, a drawer system, a vertical bottle holder, a cabinet, an ice chest, a cooler, a shoe rack, a hanger system, a pillow bottom desk, a desk and an expandable desk.

10. A configurable cart system comprising:
    an accessory receiving open centered base frame with four corners;
    at least one accessory with four corners;
    at least two or more accessory receiving open centered frames with four corners,
    wherein each of said accessory receiving open centered frames includes:
       a bottom;
       an external perimeter;
       an internal perimeter framing said open center; and
       a mounting portion between said external perimeter and said internal perimeter;
    a first end frame;
    a second end frame;
    wherein said second accessory receiving frame is securely positioned above said accessory receiving base frame using said first and said second end frames; and
    wherein said second accessory receiving frame has a perimeter corresponding to said first accessory receiving frame such that both said first and said second accessory receiving frame are dimensioned to receive said at least one accessory with at least one corresponding dimension; and
    each of said at least one accessory for use with said at least first and said second accessory receiving frames has:
       an accessory bottom;
       a resting portion; and
       four protrusions projecting from said four corners of said at least one accessory; wherein
          said protrusions engage the four corners of said receiving frame; and
          where said resting portion rests on said mounting portion of said accessory receiving frame.

11. The configurable cart system of claim 10, wherein said first and said second accessory receiving frames have a cross connector so that said receiving frames can receive more than one accessory.

12. The configurable cart system of claim 10, further comprising at least one foot attached to said bottom of said accessory receiving frame.

13. The configurable cart system of claim 12, wherein said feet are casters.

14. The configurable cart system of claim 10, wherein said at least one accessory is selected from the group consisting of a basket, a shelf, a shallow drawer shelf, an horizontal bottle rack, a drawer system, a vertical bottle holder, a cabinet, an ice chest, a cooler, a shoe rack, a hanger system, a pillow bottom desk, a desk and an expandable desk.

15. The configurable cart system of claim 14, further comprising at least four accessories and wherein said accessories are arranged in a two by two configuration.

16. The configurable cart system of claim 10 wherein said end frames are vertically adjustable.

17. The configurable cart system of claim 10 wherein each of said accessory receiving frames are adjustable.

18. A configurable cart system comprising:
    an accessory receiving open centered base frame including:
       a bottom;
       an external perimeter;
       an internal perimeter framing said open center; and
       a top having an external mounting portion between said external perimeter and said internal perimeter;
    at least one accessory dimensioned for use with said accessory receiving base frame, wherein said at least one accessory includes:

a resting portion that rests on and secures said accessory to the external mounting portion; and
at least one protrusion that abuts against said internal perimeter of said frame.

19. The configurable cart system of claim 18 further comprising:
one or more like dimensioned receiving frames positioned and securely mounted above said accessory receiving base frame to receive a variety of accessories.

20. The configurable cart system of claim 19, wherein said at least one accessory is selected from the group consisting of a basket, a shelf, a shallow drawer shelf, an horizontal bottle rack, a drawer system, a vertical bottle holder, a cabinet, an ice chest, a cooler, a shoe rack, a hanger system, a pillow bottom desk, a desk and an expandable desk.

* * * * *